(12) United States Patent
Black et al.

(10) Patent No.: US 11,494,521 B2
(45) Date of Patent: Nov. 8, 2022

(54) INTEGRATED COMMUNICATION SECURITY

(71) Applicants: Alistair Black, Los Gatos, CA (US); Ashitosh Swarup, Burbank, CA (US)

(72) Inventors: Alistair Black, Los Gatos, CA (US); Ashitosh Swarup, Burbank, CA (US)

(73) Assignee: Cuica LLC, Plano, TX (US)

( * ) Notice: Subject to any disclaimer, the term of this patent is extended or adjusted under 35 U.S.C. 154(b) by 10 days.

(21) Appl. No.: 17/235,840

(22) Filed: Apr. 20, 2021

(65) Prior Publication Data

US 2022/0019702 A1    Jan. 20, 2022

Related U.S. Application Data

(60) Provisional application No. 63/052,856, filed on Jul. 16, 2020.

(51) Int. Cl.
| | |
|---|---|
| *G06F 21/78* | (2013.01) |
| *G06F 1/06* | (2006.01) |
| *G06F 21/71* | (2013.01) |
| *G11C 7/22* | (2006.01) |

(52) U.S. Cl.
CPC ............... *G06F 21/78* (2013.01); *G06F 1/06* (2013.01); *G06F 21/71* (2013.01); *G11C 7/222* (2013.01)

(58) Field of Classification Search
CPC .......... G06F 21/78; G06F 1/06; G06F 21/602; G06F 21/71; H04L 2209/12
See application file for complete search history.

(56) References Cited

U.S. PATENT DOCUMENTS

| | | | | |
|---|---|---|---|---|
| 9,213,835 B2 * | 12/2015 | Lesea | ...................... | G06F 21/72 |
| 9,465,961 B2 * | 10/2016 | Ware | ...................... | H04L 9/065 |
| 9,614,666 B2 * | 4/2017 | Kishinevsky | ........... | G06F 21/85 |
| 10,200,192 B2 * | 2/2019 | Buch | ........................ | G09C 1/00 |
| 2002/0124033 A1 * | 9/2002 | Takahashi | .................. | G06F 7/58 |
| | | | | 708/250 |
| 2003/0145216 A1 * | 7/2003 | Nakane | .............. | G06K 7/10059 |
| | | | | 713/193 |
| 2022/0019702 A1 * | 1/2022 | Black | .................... | G06F 21/606 |

* cited by examiner

*Primary Examiner* — Lizbeth Torres-Diaz
(74) *Attorney, Agent, or Firm* — David R. Stevens; Stevens Law Group

(57) ABSTRACT

Systems and methods for integrated communication security are described. One aspect includes a clock generator configured to generate a clock signal at a first frequency, and a circuit utilizing the clock signal. The circuit may include a port configured to receive an encryption sequence at the first frequency, and a first unidirectional data path between the port and a memory configured to permit data transfer from the port to the memory. The memory may be configured to access the encryption sequence from the port via the first unidirectional data path and store the data. The circuit may further include a clock divider configured to divide the first frequency by a divisor deriving another clock signal at a second frequency, and an encryption/decryption module configured to read a portion of the encryption sequence from the memory, process input using the portion of the encryption sequence, and generate output responsive to the processing.

20 Claims, 15 Drawing Sheets

INTEGRATED COMMUNICATION SECURITY

RELATED APPLICATION

This application claims the priority benefit of U.S. Provisional Application Ser. No. 63/052,856, entitled "Application Of Long-Length Pseudorandom Sequences For Data Encryption", filed Jul. 16, 2020, the disclosure of which is incorporated by reference herein in its entirety

BACKGROUND

Technical Field

The present disclosure relates to systems and methods facilitating digital communication security and, more particularly, to storing arbitrary lengths of random or pseudorandom sequences used to encrypt data while limiting a speed or rate at which portions these sequences can be accessed from memory, thereby increasing the tamper resistance of a storage and distribution mechanism associated with a random number pool.

Background Art

Contemporary data encryption schemes that use random numbers for encryption (e.g., one-time pads, public/private key encryption, AES key encryption, etc.) face several challenges for successful implementation. For example, there needs to be a mechanism for key transfer that is secret and tamper-proof. The inherent robustness of the security algorithm is another area where the algorithm might suffer from one or more weaknesses. The associated encryption and decryption processes may suffer from poor performance (e.g., compute time and latency). Tamper resistance is another area where such encryption schemes are limited—an attacker who takes physical possession of a device that stores a set of encryption sequences can read out the entire set of sequences and gain access to the encryption secret.

Any implementation of an encryption scheme must be algorithmically feasible in real-time; however, the encryption scheme must also must also prevent creation of security holes that allow attackers to bypass the security of the encryption. The encrypted data must maintain security over time, and the security model of the application must be consistent and compatible with the encryption scheme.

SUMMARY

Aspects of the invention are directed to systems and methods for integrated circuit or chipset design that use arbitrarily lengths of a random or pseudorandom sequence to encrypt one or more data elements comprising a datastream while limiting a speed or rate at which portions these sequences can be accessed from memory.

In one aspect, a data encryption system using lengths of random or pseudorandom sequences includes a clock generator configured to generate a reference clock signal at a reference frequency. A circuit included in the data encryption system further includes a clock divider configured to divide the reference frequency of the reference clock signal and generate a low clock signal at a lower frequency. The integrated circuit may also include a data write port, a memory, and an encryption/decryption module. The data write port is configured to receive an encryption sequence at the reference frequency. The memory is configured to receive the encryption sequence from the data write port via a first unidirectional data path and store the encryption sequence. The encryption/decryption module is configured to read a portion of the encryption sequence from the memory via a second unidirectional data path at the lower frequency, process input data using the portion of the encryption sequence, and generate output data responsive to the processing.

In an aspect, implementing an encryption scheme using arbitrarily lengths of a random or pseudorandom sequence includes receiving a reference clock signal at a reference frequency. A clock divider divides the reference clock signal to generate a lower clock signal at a lower frequency. An encryption sequence (e.g., a random or pseudorandom sequence) is written at a data write port using the reference clock signal. The encryption sequence is transferred to a memory location via a first unidirectional data path. A portion of the encryption sequence retrieved is from the memory location via a second unidirectional data path, and is processed along with input data to generate (e.g., encrypted) output data.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
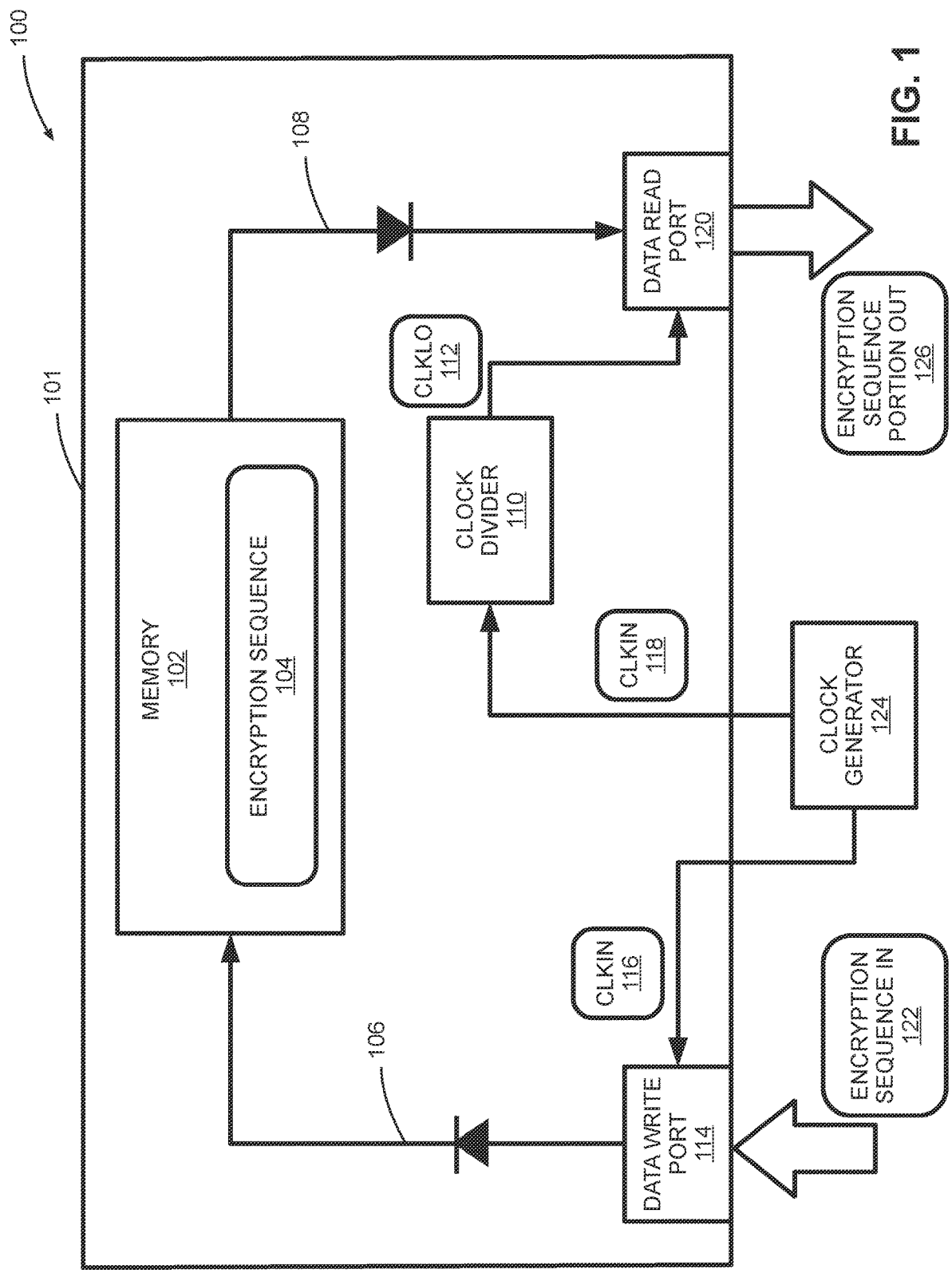
FIG. 1 is a block diagram depicting an example circuit architecture of an encryption sequence storage and delivery system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Contemporary encryption techniques using random or pseudorandom number sequence pools provide data encryption capabilities; however, such systems have several shortcomings. For example, it may be difficult to distribute random number pools, and then to manage and protect these random number pools once they are distributed. An attacker who takes physical possession of a storage device containing such a set of sequence pools can read out the encryption sequences and gain access to the encryption secret. Further, if the random number sequence/pool is stored on a computer hard drive, a hacker who gains access to the computer may also gain access to the random number pool. A a random number pool-based encryption system that prevents tampering with or viewing of the random number pool during distribution and during the use of the pool would be beneficial. In a typical use case, the encryption system may be enabled to deliver strong end-to-end encryption of communication or stored data.

Aspects of the invention described herein are configured to limit an attacker's access to a set of encryption sequences stored on an encryption device such as an integrated circuit. This property of tamper resistance is achieved by restricting a rate at which data can be read out of the encryption device. By this property, an attacker is unable to read out an entire pool of encryption sequences in a reasonable amount of time.

FIG. 1 is a block diagram depicting an example circuit architecture of an encryption sequence storage and delivery system 100. As depicted, data encryption system 100 includes a clock generator 124, and encryption sequence storage and delivery circuit 101. Encryption sequence storage and delivery circuit 101 further includes data write port 114, data read port 120, memory 102, unidirectional data path 106, unidirectional data path 108, and clock divider 110

In an aspect, clock generator 124 is configured to generate one or more clock signals. Each of these clock signals may be a digital clock signal capable of clocking a digital circuit, and may conform to a digital logic standard such as LVC-MOS, TTL, or any other digital logic standard. Clock generator 124 may be any of a quartz crystal oscillator, a digital clock generator circuit, or any other system that is capable of generating one or more clock signals.

In an aspect, encryption sequence storage and delivery circuit 101 is configured to store encryption sequence 104 in memory 102. In aspect, encryption sequence storage and delivery system 100 is implemented on an integrated circuit, a field-programmable gate array (FPGA), complex programmable logic device (CPLD), or any other capable silicon device. Memory 102 may be implemented as a programmable block of encryption sequence storage and delivery circuit 101.

In an aspect, encryption sequence 104 is a random sequence, a pseudorandom sequence (e.g., a chaotic sequence), a hash table, or any other mapped encryption scheme stored in memory 102. Memory 102 can store a random number pool that contains one or more random or pseudorandom number sequence blocks of a given length. Each random or pseudorandom number sequence may be generated by, for example, hash codes, chaotic maps, or other methods of random or pseudorandom number generators from specified algorithms or from quantum computers. The random or pseudorandom number sequence is stored in memory 102 in the form of a random number pool, in RAM, NVM, or other type of on-chip or off-chip memory. In one aspect, a random or pseudorandom number sequence is stored in a non-volatile memory. This non-volatile memory storing the random or pseudorandom number sequence may also be described as a "random number pool." In an aspect, the random number pool may be a single block or many blocks of random numbers, or a single data encryption circuit might have many pools. One embodiment includes single pool that consists of several blocks of random numbers.

Encryption sequence in 122 can be written to memory 102 via data write port 114 and via unidirectional data path 106, from an external data source that generates/generated encryption sequence in 122. Essentially, data write port 114 and unidirectional data path 106 act like a unidirectional parallel bus, helping ensure that data cannot be read from memory 102 via data write port 114. In other words, data write port 114 and unidirectional data path 106 make it extremely difficult (if not essentially impossible) to reverse flow of data out of memory 102 to data write port 114. In this way, an external party cannot read data from memory 102 via data write port 114.

Encryption sequence in 122 may be comprised of digital data samples associated with encryption sequence 104. In other words, encryption sequence 122 in is stored as encryption sequence 104. Data write port 114 and unidirectional data path 106 are accordingly designed to be of an appropriate data width to support transfer of encryption sequence in 122 to memory 102, where encryption sequence in 122 is stored as encryption sequence 104. In an aspect, the data width may be 8 bits, 64 bits, 128 bits, 256 bits, or some other width.

From an implementation perspective, data write port 114 and unidirectional data path 106 may be implemented on an FPGA by configuring the associated FPGA pins as input-only pins. Similarly, an interface between unidirectional data path 106 and memory 102 may be configured such that the data is written to memory 102 via an input-only port.

Clock generator 124 can generate clock signals clkin 116 and clkin 118. Clkin 116 and clkin 118 can be at the same frequency or at different frequencies. In an aspect, clock signal clkin 116 is used to synchronously clock encryption sequence in 122 at data write port 114. In other words, samples of encryption sequence 104 presented at data write port 114 by an external data source are clocked into memory 102 at a rate equal to the frequency of clkin 116.

Clkin 118 is input to clock divider 110 that is configured to divide down the frequency of clkin 118 to a frequency that is less than that of clkin 118. In an aspect, clock divider 110 may divide down the frequency of clkin 118 to generate a clock signal clklo 112 that has a frequency less than that of clkin 118. In an FPGA, a digital clock manager (DCM) may be used as a frequency divider. Another frequency division method for clkin 118 is to use a cascaded series of edge-triggered toggle flip-flops. Clklo 112 is input to data read port 120. In an aspect, data read port 120 may be used to read data associated with encryption sequence 104 from memory 102, via unidirectional data path 108, synchronously at a frequency equal to that of clklo 120. An external data sink may read this data as encryption sequence portion out 126. Encryption sequence portion out 126 may be used to encrypt communication data prior to transmission.

Essentially, unidirectional data path 108 and data read port 120 act like a unidirectional parallel bus, helping ensure that data cannot be written to memory 102 via data read port 120. In other words, unidirectional data path 108 and data read port 120 make it extremely difficult (if not essentially impossible) to reverse flow of data from data read port 120 into memory 102. In this way, an external party cannot write data to memory 102 via data read port 120. Furthermore, clock divider 110 is configured such that the frequency of clklo 112 is also less than that of clkin 116. The lower frequency of clklo 112 causes data associated with encryption sequence 104 to be read out of memory 102 at a slower rate than this data is written into memory 102.

From an implementation perspective, unidirectional data path 108 and data read port 120 may be implemented on an FPGA by configuring the associated FPGA pins as output-only pins. Similarly, an interface between memory 102 and unidirectional data path 108 may be configured such that the data is read from memory 102 via an output-only port.

In an aspect, one or more portions of encryption sequence 104 may be written out of the random number pool (i.e., encryption sequence 104) to an external data sink via data read port 120. In an aspect, an encryption subsequence of an appropriate length is written out as a portion of the stored random or pseudorandom sequence (i.e., encryption sequence 104). Once used, an encryption subsequence may never be used again. The length of encryption sequence 104 is designed to be long enough as to last the entire predicted lifetime of encryption sequence storage and delivery system 100. A random address pool (not depicted in FIG. 1) may be used to jump to and select non-sequential encryption sequences for encrypting sequential pieces of data.

In an aspect, encryption sequence 104 may be written to encryption sequence storage and delivery circuit 101, and then dispensed for use over the course, for example, weeks, months or even years. In one aspect, no portion of encryptions sequence 104 is reused. In another aspect, one or more portions of encryption sequence 104 may be reused periodically or may need to be rewritten more often than just once.

Another mechanism to add security to the random number pool (i.e., encryption sequence 104) is to use an inline hash of the random number sequence to create the actual encryption sequence. Using an inline hash isolates the random number values from the outside world entirely.

When encryption sequence storage and delivery system 100 is produced (or initially configured), memory 102 is populated with data associated with encryption sequence 104. Data population is accomplished by an external data source writing encryption sequence in 122 to data write port 114, at a frequency equal to that of clkin 116. When encryption sequence storage and delivery system 100 is deployed, encryption sequence portion out 126 is read from memory 102 at data read port 120 by an external data sink, at a frequency equal to that of clklo 112. By configuring the frequencies of clkin 116 and clklo 112, encryption sequence storage and delivery system 100 can be designed to significantly increase the time it takes to read out the entirety of encryption sequence 104 from memory 102 via data read port 120. Increasing the time to read out encryption sequence 104 can make it more difficult for attackers to obtain encryption sequence 104 in a reasonable amount of time. An example is provided subsequently.

Using a higher clock frequency for data write port 114 and a lower clock frequency for data read port 120 can address a possible integrated circuit shortcomings. When input and output frequencies are the same, a hacker or a nefarious party may be able to write out and gain access to the complete random or pseudorandom sequence in a reasonable amount of time if they get physical possession of the random number pool. For example, suppose the frequency of clkin 116 is 500 MHz. To write an entire random or pseudorandom sequence of length 1e13 samples to memory 102, it would take 20e6 seconds, or 5.67 days. If, however, clklo 112 is configured to be one-hundredth of clkin 116 at 5 MHz, reading the entire random or pseudorandom data sequence would take 566.7 days—close to 2 years.

Further improvements to encryption sequence storage and delivery system 100 may include dividing the pool (i.e., encryption sequence 104, also referred to as "random number pool") into one or more blocks. These blocks may be hashed with a cryptographic hash algorithm to form a blockchain with the random data pool and the block hash values. If the random number values are changed in any way, the hash values can also change. This enables the detection of tampering with the random number pool. Further security can be added with the addition of a nonce to the hash operation. The nonce may provide functionality similar to other blockchains such as bitcoin. In an aspect, the nonce may change the value of the hash, allowing the user to pair chips (e.g., integrated circuits) or subsystems without others knowing, by viewing the hash values. The nonce may also be used in combination with the hash algorithm to create a password or a key which enables the chip based on verifying the blockchain with the input nonce.

Figure 2:
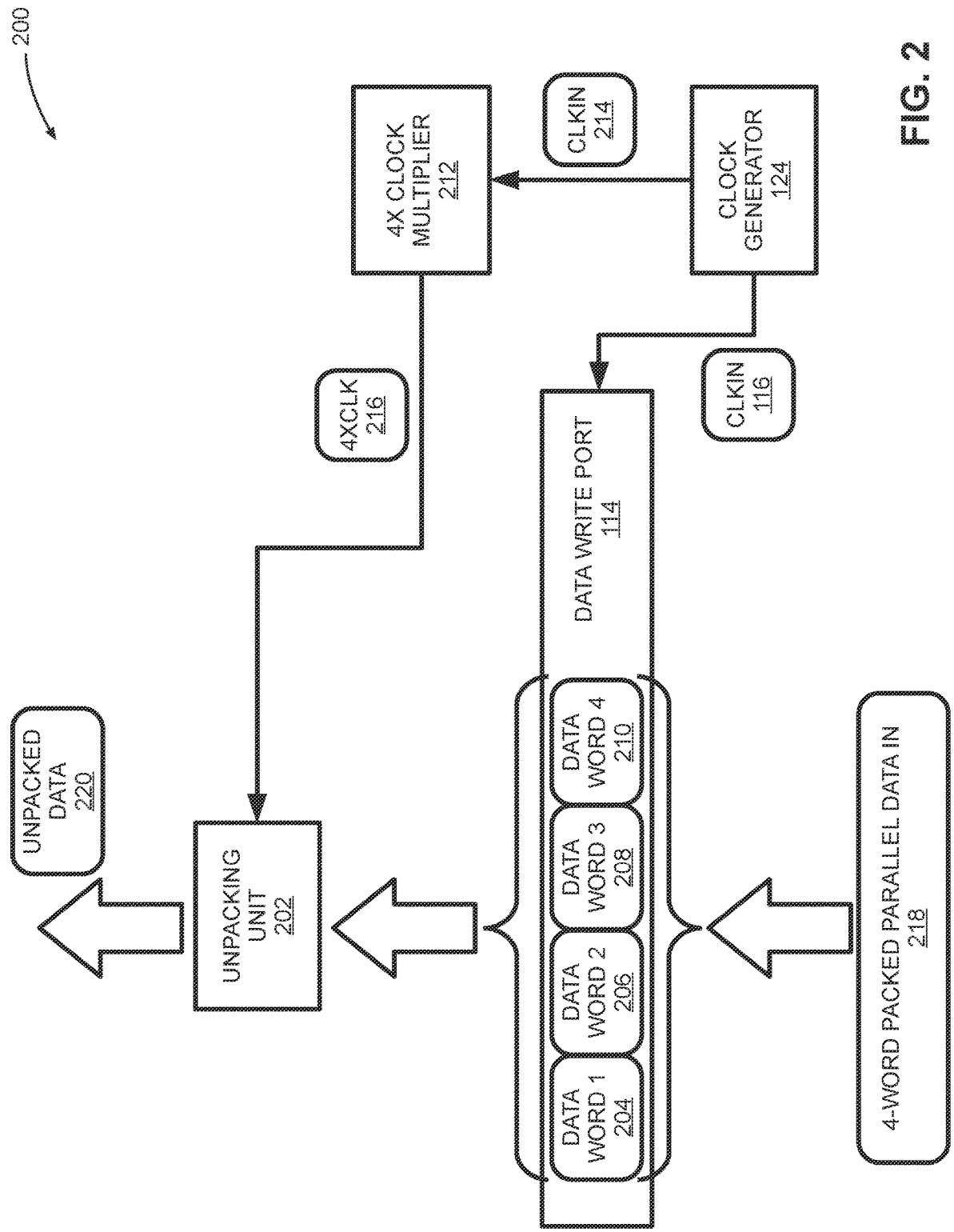
FIG. 2 is a block diagram depicting an example circuit architecture of a data unpacking system.

FIG. 2 is a block diagram depicting an example circuit architecture of a data unpacking system 200. Data unpacking system 200 enables writing an encryption sequence (e.g., encryption sequence in 122) to memory 102 at a higher data rate than if data unpacking system 200 is not used. As depicted, data unpacking system 200 includes data write port 114, clock generator 124, a 4× clock multiplier 212, and an unpacking unit 202.

In an aspect, clock generator 124 generates clock signal clkin 116 that is used to clock 4-word packed parallel data 218 in via data write port 114. 4-word packed parallel data 218 may be comprised of four data words (i.e., four distinct data samples) associated with encryption sequence 104—data word 204, data word 206, data word 208, and data word 210. The parallel bit width of data write port 114 can be equal to the sum of the bit widths of data words 204 through 210. In one aspect, the bit width of each sample of encryption sequence 104 is constant. As such the parallel bit width of data write port 114 can be four times the bit width of each sample of encryption sequence 104. For example, if the bit width of each sample of encryption sequence is 64-bit, then the parallel bit width of data write port 114 is 256 bits.

In an aspect, 4× clock multiplier 212 receives a clock signal clkin 214 from clock generator 124. The frequency of clock signal clkin 214 can be equal to the frequency of clock signal clkin 116. 4× clock multiplier 212 multiplies the frequency of clkin 214 by 4 times, to generate a clock signal 4×clk 216. The frequency of clock signal 4×clk 216 is four times the frequency of clock signal clkin 214. In an aspect, clock signal 4×clk 216 is used to clock unpacking unit 202. Unpacking unit 202 is configured to unpack data words 204 through 210 into four individual data samples, and transfer these unpacked samples as unpacked data 220 to memory 102. This transfer can be performed synchronously based on clock signal 4×clk 216.

Data unpacking system 200 enables encryption sequence in 122 (in the form of 4-word packed parallel data in 218) to be written to memory 102 four times faster than is possible if encryption sequence in 122 is read in at data write port 114 one sample at a time (i.e., the base data rate for memory write operations), based on clock signal clkin 116. In general, multiplying clock signal clkin 214 by a factor of N and correspondingly increasing the bit width of data write port 114 by a factor of N provides an N-fold increase in the rate at which encryption sequence in 122 can be written to memory 102 in a packed form, over the base data rate for memory write operations.

Figure 3:
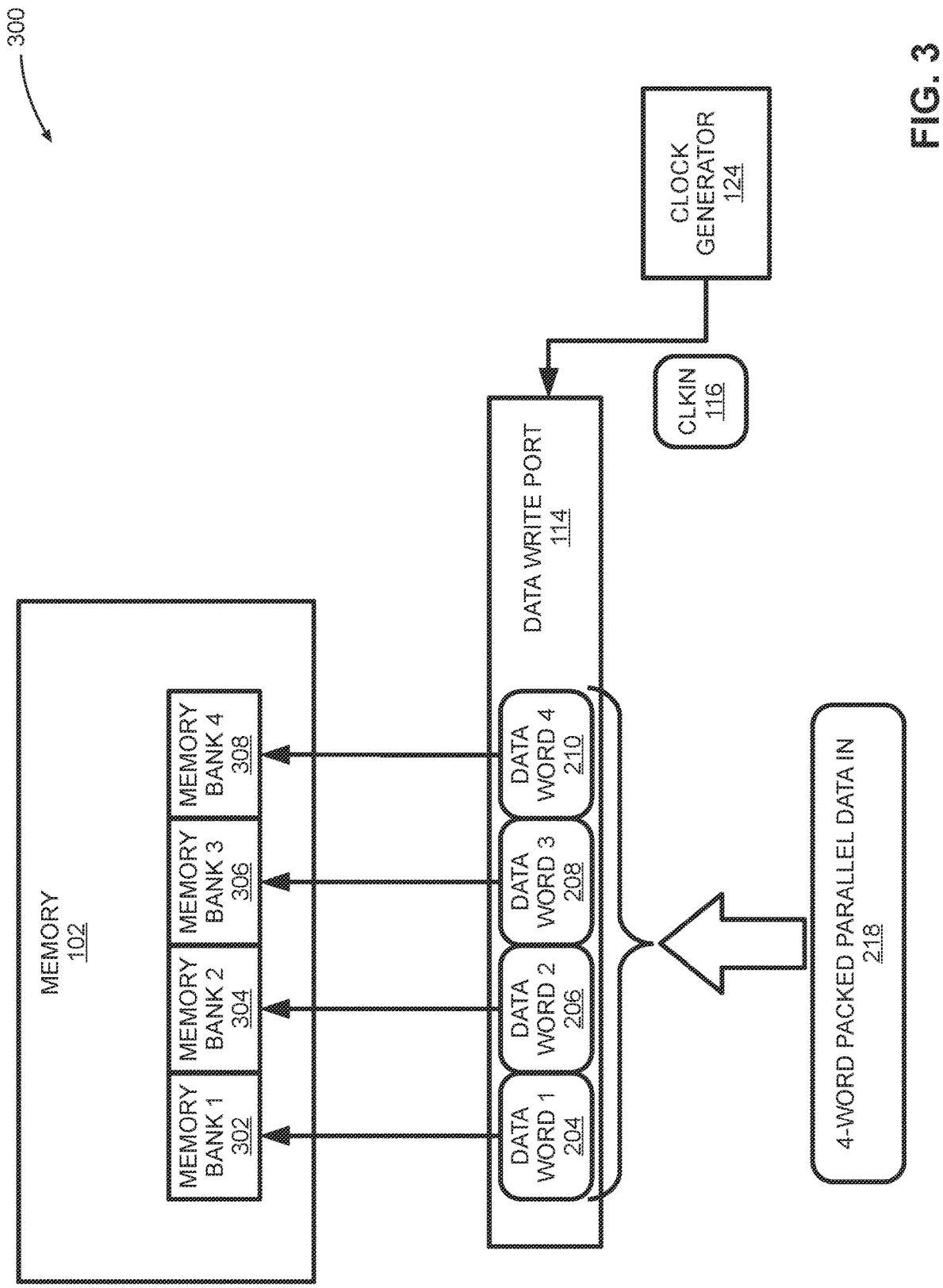
FIG. 3 is a block diagram depicting an example circuit architecture of a parallel memory write unit.

FIG. 3 is a block diagram depicting an example circuit architecture of a parallel memory write unit 300. As depicted, parallel memory write unit 300 includes clock generator 124, data write port 114, and memory 102. Memory 102 further includes a memory banks 302, 304, 306, and 308.

In an aspect, data write port 114 reads in 4-word packed parallel data in 218 synchronously with clock signal clkin 116 generated by clock generator 124. 4-word packed parallel data 218 is comprised of data words 204 through 210. At each clock cycle associated with clock signal clkin 116, data word 204 can be transferred to memory bank 302; data word 206 can be transferred to memory bank 304; data word 3 208 can be transferred to memory bank 306; and data word 210 can be transferred to memory bank 308. Data stored in memory bank 302 through memory bank 308 can comprise data associated with encryption sequence 104. During a read cycle, when data associated with encryption sequence 104 is read from memory 102, the data can be read out consecutively from memory banks 302 through memory bank 308 in a cyclic manner at a frequency equal to that of clock signal clklo 112. Parallel memory write unit 300 essentially enables faster writes of an encryption sequence (e.g., 122) to memory 102 as compared to writing a single data sample of the encryption sequence at a time to memory 102.

Figure 4:
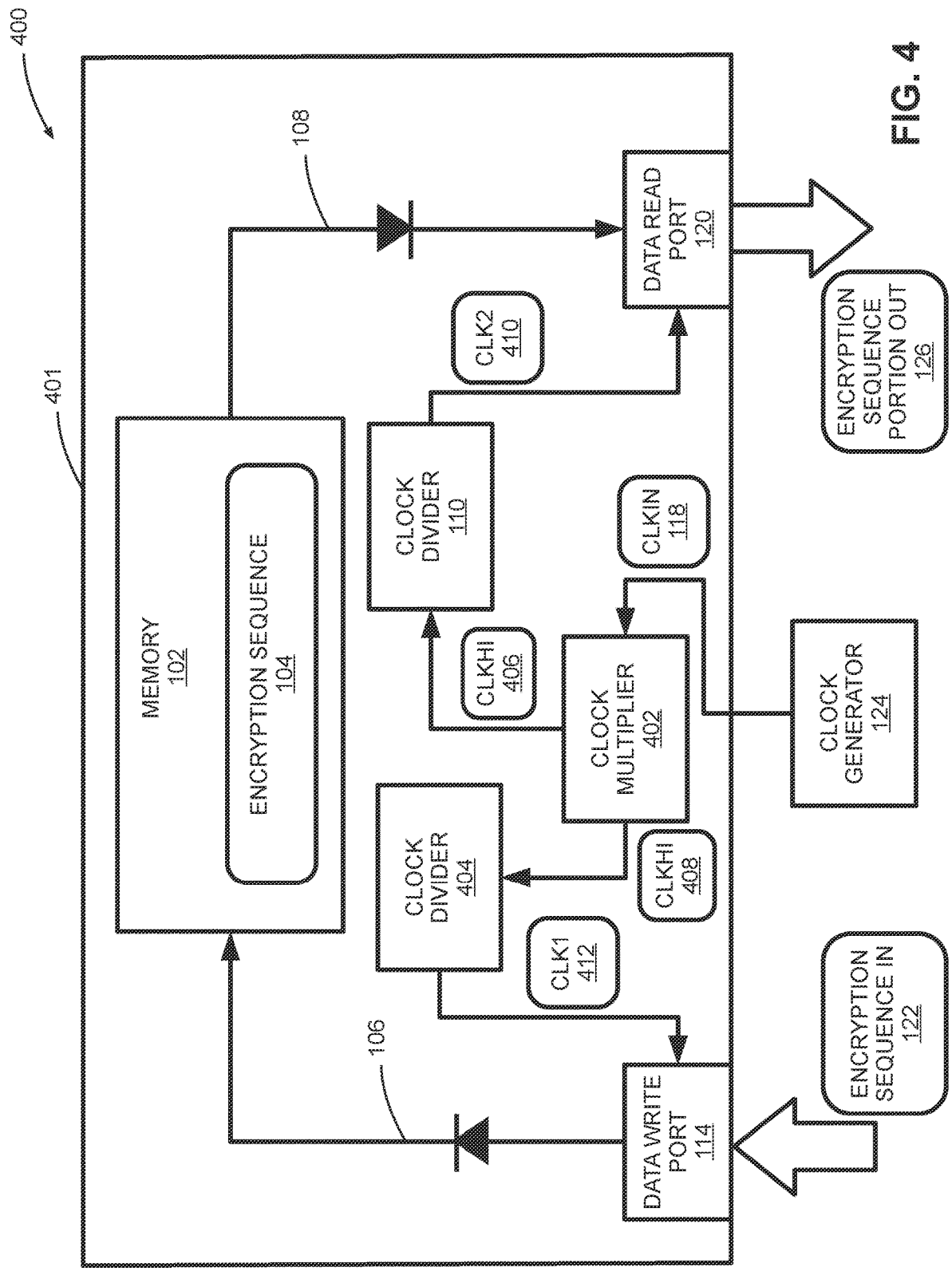
FIG. 4 is a block diagram depicting an example circuit architecture of an encryption sequence storage and delivery system.

FIG. 4 is a block diagram depicting an example circuit architecture of an encryption sequence storage and delivery system 400. As depicted, encryption sequence storage and delivery system 400 includes clock generator 124 and data encryption circuit 401. Data encryption unit 401 further includes data write port 114, data read port 120, memory 102 that stores encryption sequence 104, unidirectional data path 106, unidirectional data path 108, clock divider 110, a clock multiplier 402, and a clock divider 404.

If a nefarious party or bad actor takes physical possession of encryption sequence storage and delivery system 100, they may be able to overclock the system at a higher clock rate by increasing the frequency of clock signal clkin 118. This could potentially enable a readout of encryption sequence 104 from memory 102 at a higher data rate. In other words, the nefarious party can overclock data encryption circuit 401 and read out data associated with encryption sequence 104 via data read port 120 at a higher clock rate. The nefarious party may be able to read all of encryption sequence 104 within a reasonable amount of time, thereby compromising the security of encryption sequence storage and delivery system 100.

To prevent security compromises due to overclocking, clock multiplier 402 can receive clock signal clkin 118 from clock generator 124, and multiplies the frequency of the clock signal clkin to generate a clock signal clkhi 406 and a clock signal clkhi 408, where each of clock signal clkhi 406 and clock signal clkhi 408 have a frequency that is greater than that of clock signal clkin 118. In some aspects, clock multiplier 402 frequency-multiplies clock signal clkin 118 to generate an internal high-frequency clock signal that is routed out of clock multiplier as clock signals clkhi 406 and clkhi 408. In this case, clkhi 406 and clock signal clkhi 408 are essentially equal in frequency and essentially equivalent high-frequency clock signals. In other aspects, clock signal clkhi 406 and clock signal clkhi 408 are different frequencies.

In an aspect, clock multiplier 402 generates clock signal clkhi 406 and clock signal clkhi 408 such that the individual frequencies of these clock signals are substantially equal to or close to and below the maximum frequency supported by the silicon hardware used to construct data encryption circuit 401. If any attempt is made to operate data encryption circuit 401 beyond this maximum frequency, data errors, glitches, and other operational errors might occur.

In an aspect, clock signal clkhi 406 is input to clock divider 110 that divides down the frequency of clock signal clkhi 406 and generates clock signal clk2 410 at a lower frequency compared to clock signal clkhi 406. Clock signal clkhi 408 may also be input to clock divider 404 that generates a clock signal clk1 412 at a lower frequency compared to clock signal clkhi 408. In an aspect, a division factor associated with clock divider 404 may be equal to 1, so that clock signal clk1 412 has a frequency equal to clock signal clkhi 408.

In an aspect, an external data source writes encryption sequence data in 122 at data write port 114. Encryption sequence data in 122 is synchronously clocked into memory 102 via unidirectional data path 106, at a frequency of clock signal clk1 412. An external data sink can read encryption sequence 104 from memory 102 via unidirectional data path 108 and data read port 120, as encryption sequence portion out 126.

The clock frequency management plan associated with encryption sequence storage and delivery system 400 is such that for a planned set of frequencies for clock signals clk2 412 and clk2 410, clock signals clkhi 406 and clkhi 408 are close to the maximum frequency supported by the silicon If a bad agent or a nefarious party gains attempts to read encryption data 104 from memory 102 by overclocking data encryption circuit 401, there is an increased chance that outputs from clock multiplier 402 are inconsistent and error-prone. This, in turn, can cause read errors in the encryption sequence portion out 126, thereby thwarting any attempt to read encryption data 104 in its entirety within a reasonable time.

Another approach to assuring the slow read nature of memory 102 is to change the transistor structure itself on the chip to assure that the read speed is limited while the write speed is still fast. This approach has the advantage that no extra circuitry is needed to assure a slow read.

Figure 5:
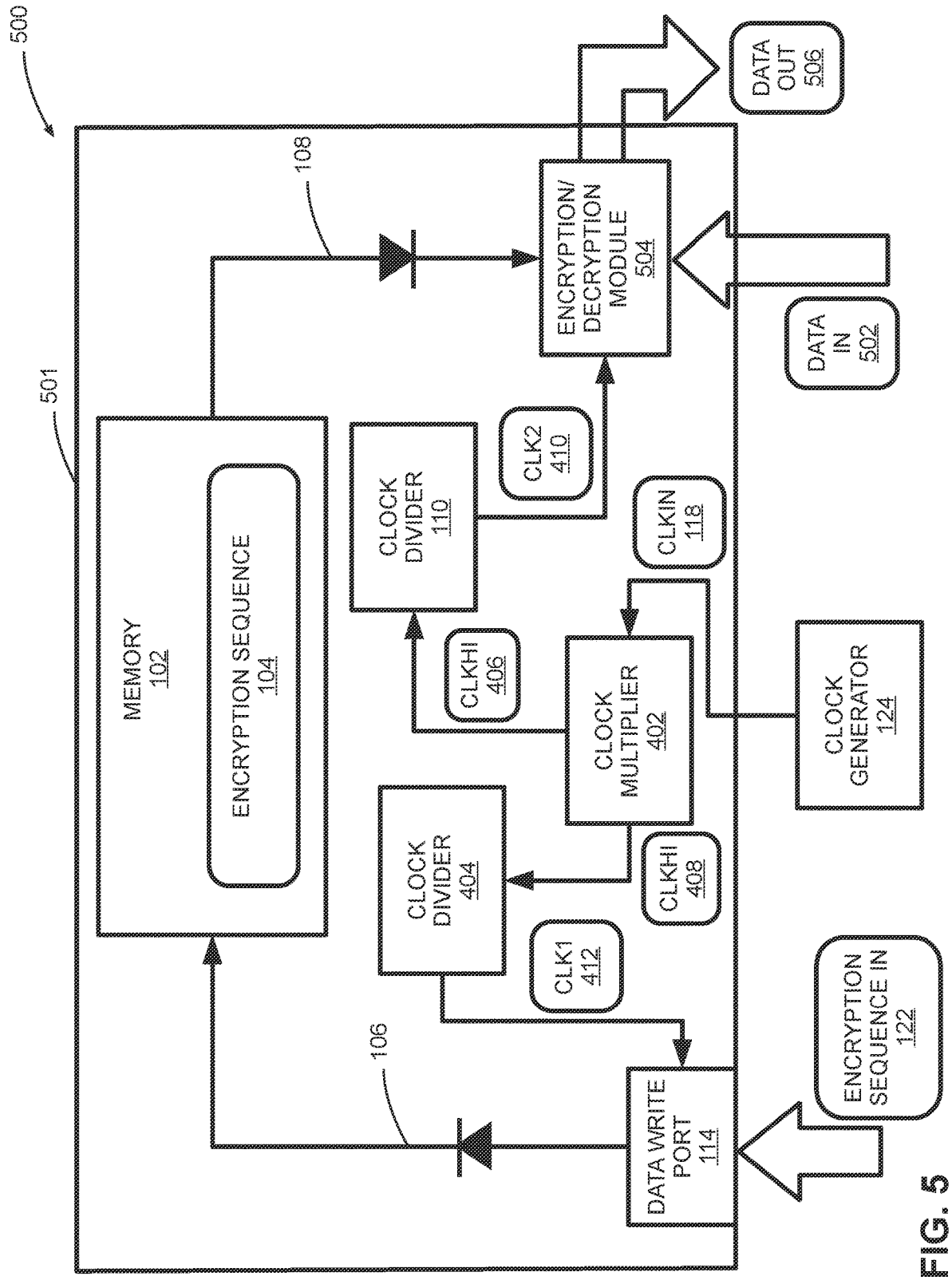
FIG. 5 is a block diagram depicting an example circuit architecture of a data encryption system.

FIG. 5 is a block diagram depicting an example circuit architecture of a data encryption system 500. As depicted, data encryption system 500 includes clock generator 124, and data encryption circuit 501. Data encryption circuit 501 further includes data write port 114, memory 102 that stores encryption sequence 104, unidirectional data path 106, unidirectional data path 108, clock divider 110, clock multiplier 402, clock divider 404, and an encryption/decryption module 504.

In an aspect, clock generator 124 generates clock signal clkin 118 that is input to clock multiplier 402. Clock multiplier generates clock signals clkhi 406 and clkhi 408, with clock signal clkhi 408 being input to clock divider 404, and clock signal clkhi 406 being input to clock divider 110. Clock divider 404 generates clock signal clk1 412; clock divider 110 generates clock signal clk2 410.

Encryption sequence data in 122 is clocked in at data write port 114 synchronously with clock signal clk1 412, and is written to memory 102 via unidirectional data path 106. Data encryption circuit 501 can be used to encrypt or decrypt data in 502, which is read into data encryption/decryption module 504. In an aspect, data in 502 may be read in synchronously with clock signal clk2 410, and may be encrypted or decrypted using a portion of encryption sequence 104 read from memory 102 via unidirectional data path 108. Data out 506 is the encrypted or decrypted data from encryption/decryption module 504.

In an aspect, data in 502 may be received by encryption/decryption module 504 using a unidirectional data path, where data in 502 may be written into encryption/decryption module 504 by an external data source via that channel. A reverse data read from encryption/decryption module 504 via this channel is technically and practically infeasible, if not impossible. If data encryption circuit 501 is an FPGA, the associated FPGA pins can be configured to be input-only pins.

In an aspect, data out 506 may be output by encryption/decryption module 504 using a unidirectional data path, where data out 506 may be read from encryption/decryption module 504 by an external data sink via that channel. A reverse data write to encryption/decryption module 504 via this channel is technically and practically infeasible, and possibly blocked. If data encryption circuit 501 is an FPGA, the associated FPGA pins can be configured to be output-only pins.

In an aspect, if data encryption system 501 is used to encrypt data for transmission, encryption/decryption module 504 may function in an encryption mode, using samples of a portion of encryption sequence 104 to encrypt samples of data in 502, and generate encrypted samples as data out 506.

In an aspect, if data encryption system 501 is used to decrypt received encrypted data, encryption/decryption module 504 may function in a decryption mode, using samples of a portion of encryption sequence 104 to decrypt samples of data in 502, and generate decrypted samples as data out 506.

In an aspect, encryption/decryption module 504 may be implemented on data encryption circuit 501 as a XOR gate or an array of XOR gates that can encrypt or decrypt data in 502. In another aspect, Multiple versions of data encryption circuit 501 may be run in parallel in order to create a bit slice approach to encryption. This implementation allows higher rates of data transfer to occur.

Figure 6:
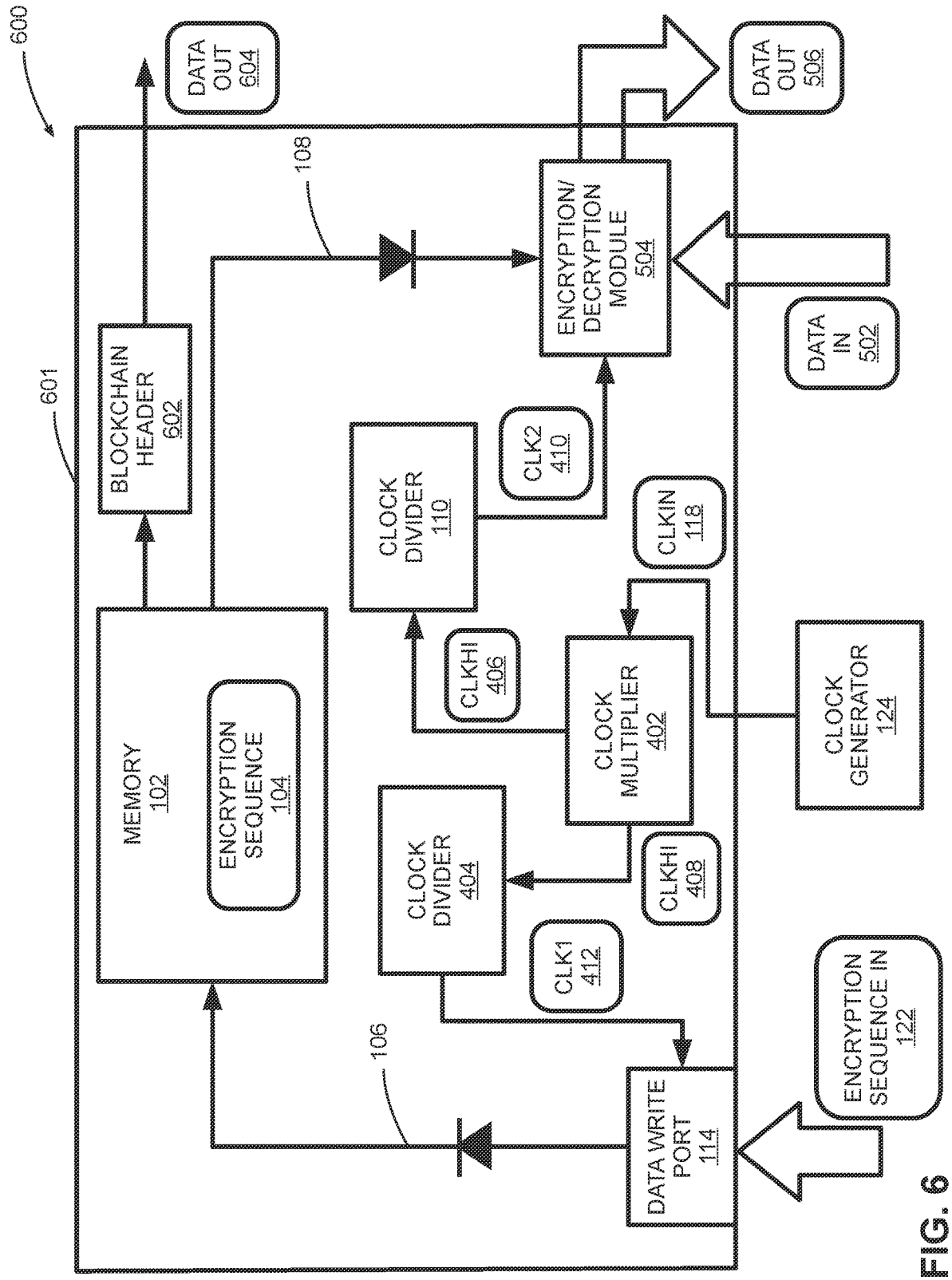
FIG. 6 is a block diagram depicting an example circuit architecture of a data encryption system.

FIG. 6 is a block diagram depicting an example circuit architecture of a data encryption system 600. As depicted, data encryption system 600 includes clock generator 124, and a data encryption circuit 601. Data encryption circuit 601 further includes data write port 114, memory 102 that stores encryption sequence 104, unidirectional data path 106, unidirectional data path 108, clock divider 110, clock multiplier 402, clock divider 404, encryption/decryption module 504, and a blockchain header 602.

Data encryption circuit 601 is configured to store samples of encryption sequence data in 122 to memory 102 as encryption sequence 104. A portion of encryption sequence 104 is used by encryption/decryption module 504 to encrypt or decrypt data in 502 to generate data out 506. In an aspect, encryption sequence 104 may be stored in a blockchain.

In an aspect, blockchain header 602, when combined with encryption sequence 104, forms a blockchain. Blockchain header 602 may be configured to provide a tamper detection capability to data encryption circuit 601. Any efforts to tamper with data encryption circuit 601 can result in changes to blockchain header 602. These unauthorized changes can be detected during periodic reads of blockchain header 602. In this way, unauthorized access to the data encryption circuit 601 can be detected. Hash values in blockchain header 602 can also be used to verify that data encryption circuit 601 can communicate with another similar circuit based on random number sets.

In one aspect, unlike typical blockchains such as BITCOIN, the blockchain implemented on data encryption system 600 is used to hide the data (i.e., encryption sequence 104) while confirming that the data has not been changed or tampered with. This feature is enabled due to the ability to read the hash values. This capability, in addition to the limitations on the data read rate, enables the security of the random number pool to be maintained.

In an embodiment, an additional feature designed to limit tampering with encryption sequence 104 may include limiting write operations to one block at a time. These write operations may be performed in sequence by not allowing lower digits of an associated memory address to be controlled during a write operation. Instead, an internal counter is used during the write operation for the lower bits corresponding to individual blocks in the blockchain. In this way, hash execution can occur less frequently, for example, when writing a given block is complete and possibly when data encryption circuit 601 is powered up, in case there is some kind of exploit that can occur while data encryption circuit 601 is powered down.

In an aspect, once data is written to data encryption circuit 601, it is extremely difficult for anyone to see the result of an associated encryption/decryption process by data encryption/decryption module 504 on data in 502, as data out 506. For example, it may not be possible to ever directly read the random number pool. In this way, the random number pool (i.e., encryption sequence 104) is always hidden from external view. Some features of data encryption circuit 601 that enable this behavior are:

A very large memory pool (i.e., memory 102) in which a random number set may be written.

Ability to write directly to the memory pool at high speed from an external source.

Extremely limited (or no) ability to read the pool externally (due to data encryption/decryption module 504).

Data encryption circuit 601 can support two distinct clock rates—a higher clock rate used for writing random or pseudorandom data into memory 104, and a (e.g., much) lower clock rate for reading random or pseudorandom data from memory 104 within data encryption circuit 601.

Additional circuitry that may be implemented in data encryption circuit 601 may limit writing operations to one full data block at a time in sequence (not random-access writing). This has the effect of creating a chip (i.e., a circuit) that can hold a random number sequence used for encryption that cannot be read quickly out of the circuit once the data is written to the circuit.

A blockchain configuration of hashing is implemented on data encryption circuit 601 using blockchain header 602. This helps ensure that any random data stored in the memory 102 has not changed in transit, or due to some unexpected operation on the chip. These hash values can also be used to match two different data encryption circuits for encrypted communication.

To facilitate encryption of high-speed communication, one or more versions of data encryption circuit 601 can be used in a 'bit slice' manner, where multiple such versions can be used in parallel to improve communication speed and data throughput.

Elements of data encryption circuit 601 can include:

Element 1: Random Number Pool (e.g., memory 102 with encryption sequence 104) with separate write and read paths, and limited pool read clocking and fast pool write clocking to limit pool readability.

Element 2: Write clocking mechanisms to limit write process without limiting write speed.

Element 3: Hashing and Blockchain used to track random number pool integrity and use.

Element 4: Parallel configuration of security ICs in bit slice configuration for speed.

Element 5: Full integration vs. partial integration architectures.

Element 6: Chaotic Waveform generator as further security and extension of pool size.

Additional security aspects can be enabled to make it more difficult for an attacker to decipher a coding scheme associated with encryption sequence 104. For example, the associated random number pool can be designed/configured so that an entire block of data (e.g., from memory location 0x0000 to 0xFFFF in the memory bank associated with the random number pool) is hashed at one time after being written to memory via the data write port. If the data block is tampered with or changed in some way, the value of the hash can also change. This further enables a detection of the tampering.

In an embodiment, a single integrated chip is enabled to handle the entire security operation, thus making it almost impossible to perform any read of the random number pool if the chip is intercepted during distribution to an intended recipient. If this is not possible and the non-volatile memory (NVM) must be a separate IC in a chip carrier, a tamper vulnerability may exist. In this case the NVM may be extracted from the board and read at high speed, thus compromising the random number pool. The numbers may then be read into a new chip and used. In order to overcome this vulnerability several approaches can help. First if the chip containing the pool data has the clock limiting feature on the read function then the loss of data can be limited by time—though this limits hashing ability. Second, the chip carrier can be manufactured so it is very difficult to remove the memory chip. A third method is if once data is written the chip remains in the physical control of the user at all times so data tampering can never happen.

Figure 7:
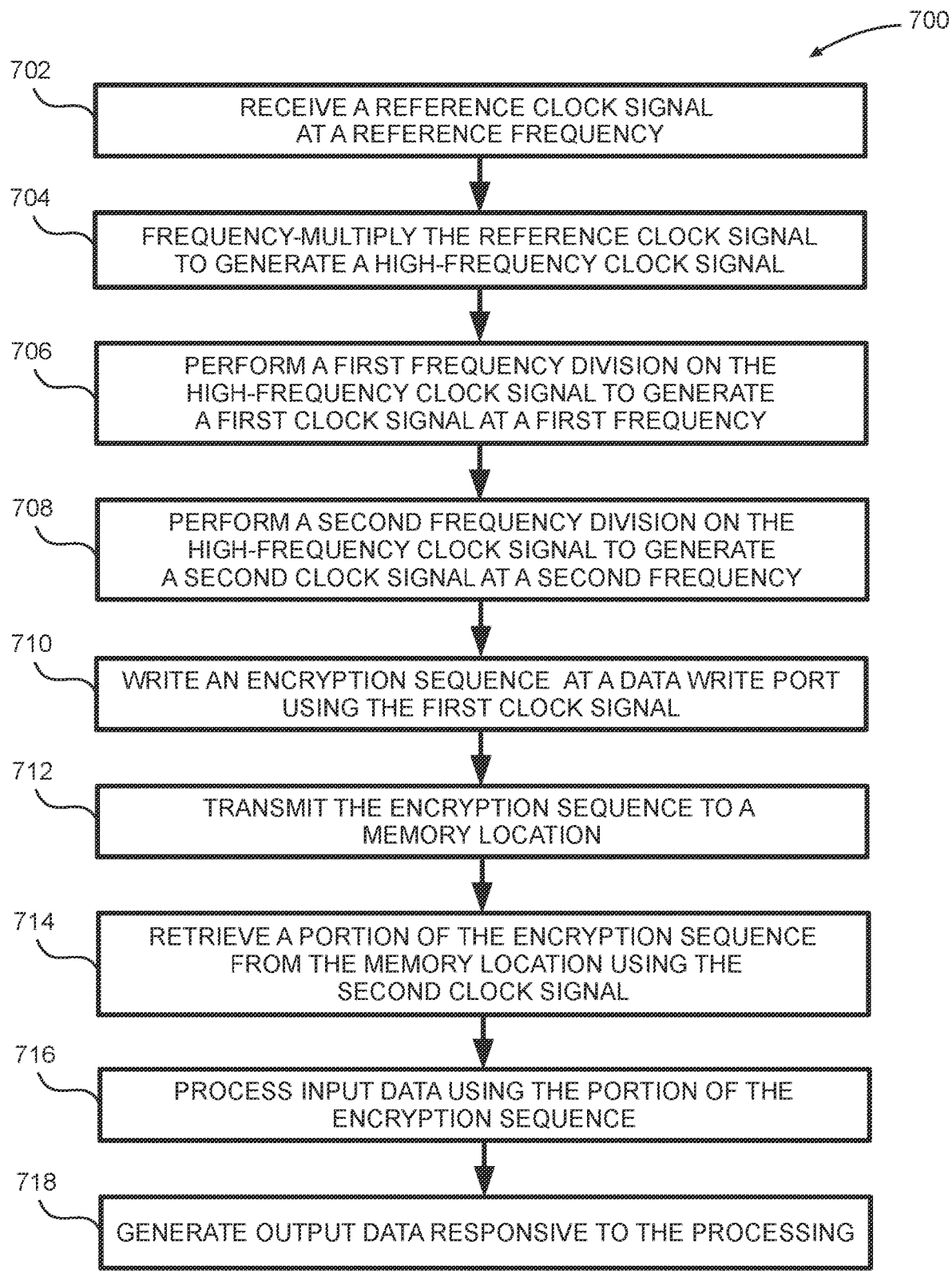
FIG. 7 is a flow diagram depicting an example method for implementing a clocking scheme.

FIG. 7 is a flow diagram depicting an example method 700 for implementing a clocking scheme. Method 700 will be described with respect to the components and data in computer architectures 100, 200, 300, 400, 500 and 600. In an aspect, method 700 includes receiving a reference clock signal at a reference frequency (702). For example, clock multiplier 402 may receive clock signal clkin 118 from clock generator 124. Clock signal clkin 118 can act as a reference clock signal, and the frequency of clock signal clkin 118 is the reference frequency.

Method 700 may include frequency-multiplying the reference clock signal to generate a high-frequency clock signal (704) at a higher frequency compared to the reference frequency. For example, clock multiplier 402 generates clock signals clkhi 406 and clkhi 408, each of which functions as a high-frequency clock signal. In an aspect, clock signals clkhi 406 and clkhi 408 may be identical, and derived from a single high-frequency clock signal generated internally by clock multiplier 402. The high-frequency clock signal is routed as two separate clock signals—clkhi 406, and clkhi 408.

Method 700 may include performing a first frequency division on the high-frequency clock signal to generate a first clock signal at a first frequency (706). For example, clock divider 404 can frequency-divide clock signal clkhi 408 to generate clock signal clk1 412 that functions as the first clock signal.

Method 700 may include performing a second frequency division on the high-frequency clock signal to generate a second clock signal at a second frequency (708). For example, clock divider 110 can frequency-divide clock signal clkhi 406 to generate clock signal clk2 410 that functions as the second clock signal.

Method 700 may include writing an encryption sequence at a data write port using the first clock signal (710). For example, encryption sequence in 122 may be clocked in to data write port 114 synchronously with clock signal clk1 412.

Method 700 may include transmitting the encryption sequence to a memory location (712). For example, encryption sequence in 122 may be transmitted from data write port 114 to a location (e.g., a memory address in) memory 102 via unidirectional data path 106.

Method 700 may include retrieving a portion of the encryption sequence from the memory location using the second clock signal (714). For example, a portion of encryption sequence 104 may be retrieved from memory 102 (e.g., from a memory address associated with memory 102), via unidirectional data path 108, using clock signal clk2 410.

Method 700 may include processing input data using the portion of the encryption sequence (716). For example, encryption/decryption module 504 may process data in 502 using the portion of encryption sequence 104. Processing data in 502 may include any form of encoding/encrypting or decoding/decrypting the input data using the portion of the encryption sequence. Processing data in 502 may further include methods such as XOR addition, hashing, lookup tables, and so on. If data in 502 is data to be encrypted and transmitted, then the processing is an encryption operation that may include encrypting data in 502 using the portion of the encryption sequence. If data in 502 is received data that is encrypted and needs to be decrypted, then the processing is an decryption operation that may include decrypting data in 502 using the portion of the encryption sequence.

Method 700 may include generating output data responsive to the processing (718). In an aspect, encryption/decryption module 504 processes data in 502 using a portion of encryption sequence 104, to generate data out 506. If the processing in stage 716 is an encryption operation, then data out 506 is encrypted data that may be transmitted to a receiver. The receiver has an encryption sequence that is matched with encryption sequence 104. The encryption sequence at the receiver is used to decrypt the encrypted data using the matched encryption sequence.

If the processing in stage 716 is a decryption operation, data in 502 is encrypted data that is received by data encryption circuit 501. Encrypt/decrypt module 504 decrypts data in 502 using a portion of encryption sequence 104, to generate decrypted data out 506. Data out 506 can then be processed by a computing system (e.g., a desktop computer or a server) communicatively coupled to data encryption system 500.

Figure 8:
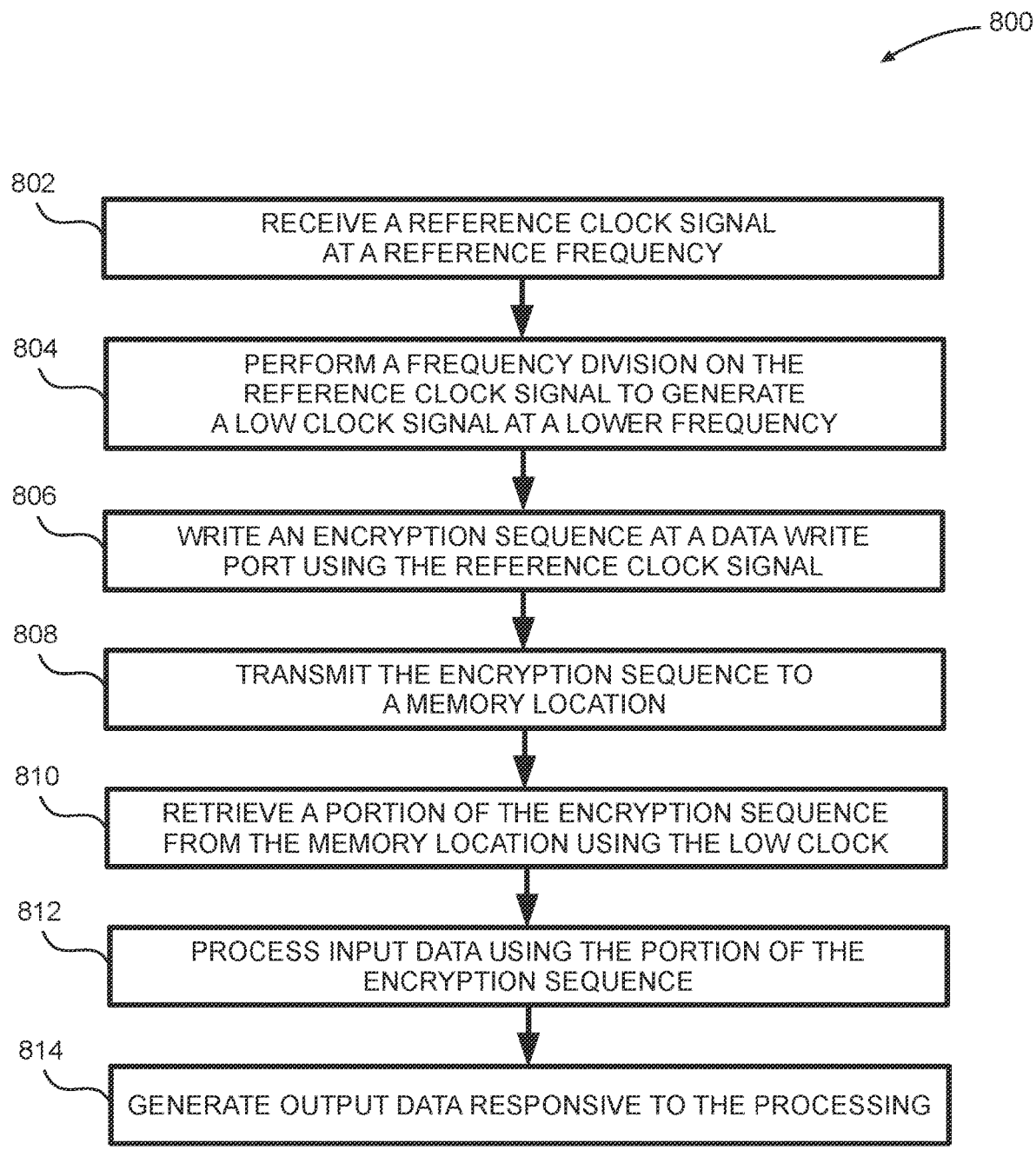
FIG. 8 is a flow diagram depicting an example method for implementing a clocking scheme.

FIG. 8 is a flow diagram depicting an example method 800 for implementing a clocking scheme. Method 800 will be described with respect to the components and data in computer architectures . . . . In an aspect, method 800 includes receiving a reference clock signal at a reference frequency (802). For example, clock multiplier 102 may receive clock signal clkin 118 from clock generator 124. Here, clock signal clkin 118 acts as a reference clock signal.

Method 800 may include performing a frequency division on the reference clock signal to generate a low clock signal at a lower frequency (804). For example, clock divider 110 can divide clock signal clkin 118 to generate low clock signal clklo 112 at a lower frequency compared to the reference frequency.

Method 800 may include writing an encryption sequence at a data write port using the reference clock signal (806). For example, encryption sequence in 122 may be clocked in to data write port 114 synchronously with clock signal clkin 116.

Method 800 may include transmitting the encryption sequence to a memory location (808). For example, encryption sequence in 122 may be transmitted from data write port 114 to a location (e.g., a memory address in) memory 102 via unidirectional data path 106.

Method 800 may include retrieving a portion of the encryption sequence from the memory location using the low clock (810). For example, a portion of encryption sequence 104 may be retrieved from memory 102 (e.g., from a memory address associated with memory 102), via unidirectional data path 108, using clock signal clklo 112.

Method 800 may include processing input data using the portion of the encryption sequence (812). In an aspect, encryption sequence storage and delivery circuit 101 may be modified such that data write port 120 is replaced by encryption/decryption 504 module that functions similarly to encryption/decryption module included in data encryption circuit 501. In this case, encryption/decryption module 504 may process data in 502 using the portion of encryption sequence 104. Processing data in 502 may include any form of encoding/encrypting or decoding/decrypting the input data using the portion of the encryption sequence. Processing data in 502 may further include method such as XOR addition, hashing, lookup tables, and so on. If data in 502 is data to be encrypted and transmitted, then the processing is an encryption operation that may include encrypting data in 502 using the portion of the encryption sequence. If data in 502 is received data that is encrypted and needs to be decrypted, then the processing is an decryption operation that may include decrypting data in 502 using the portion of the encryption sequence.

Method 800 may include generating output data responsive to the processing (814). In an aspect, encryption/decryption module 504 generates data out 506. If the processing in stage 812 is an encryption operation, then data out 506 is encrypted data that may be transmitted to a receiver. The receiver has an encryption sequence that is matched with encryption sequence 104. The encryption sequence at the receiver is used to decrypt the encrypted data using the matched encryption sequence.

If the processing in stage 812 is a decryption operation, data in 502 is encrypted data that is received by data encryption circuit 501. Encrypt/decrypt module 504 decrypts data in 502 using a slice (i.e., a portion) of encryption sequence 104, to generate decrypted data out 506. Data out 506 can then be processed by a computing system (e.g., a desktop computer or a server) communicatively coupled to data encryption system 500.

Figure 9:
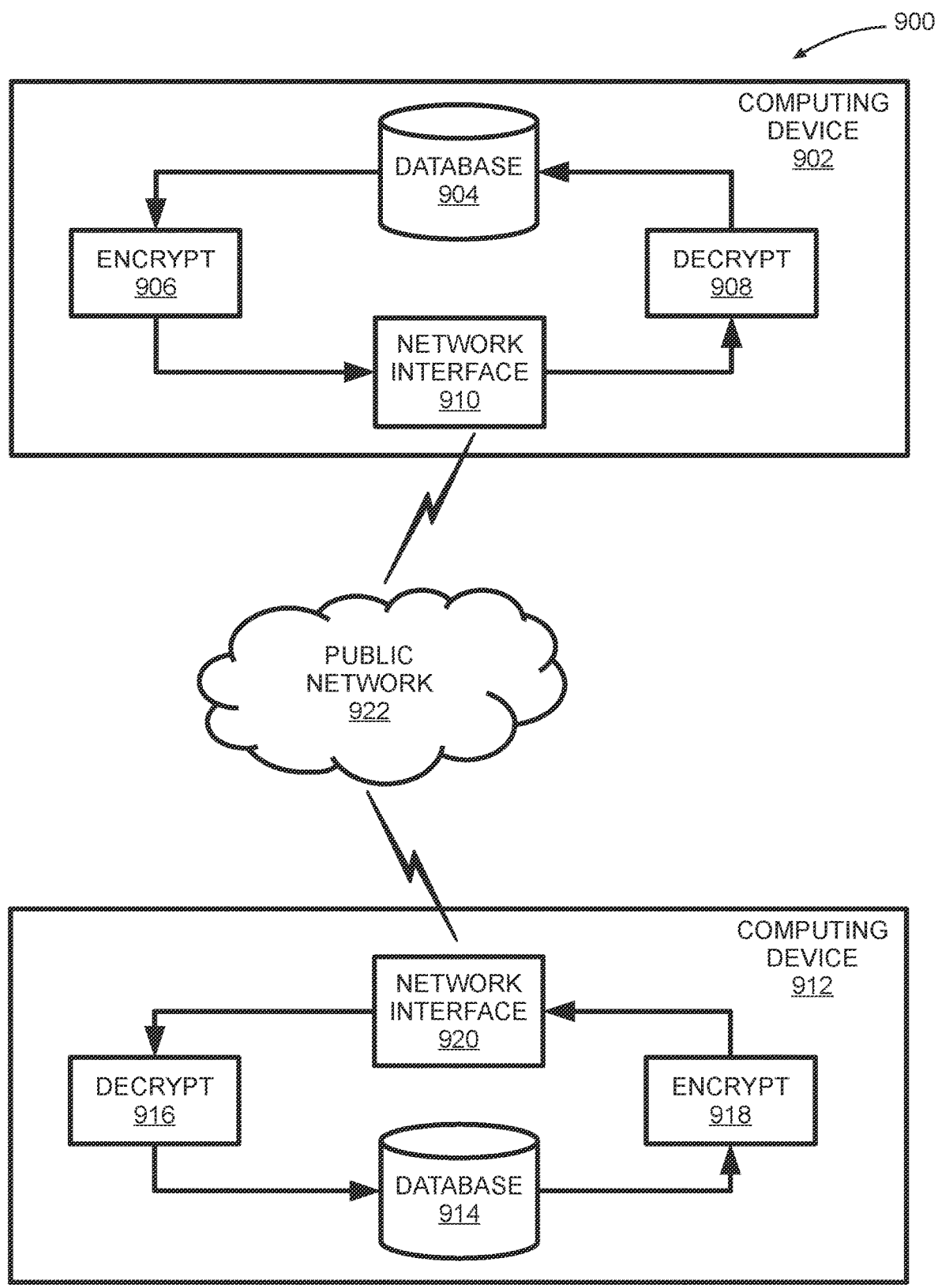
FIG. 9 is a block diagram depicting an example computer architecture of a secure computer network.

FIG. 9 is a block diagram depicting an example computer architecture of a secure computer network 900. As depicted, computer network 900 includes a computing device 902 and a computing device 912 configured to communicate with each other over a public network 922. In an aspect, computing devices 902 and 912 can include any combination of desktop computers, laptop computers, servers, mobile devices such as tablets and cellular phones, internet-of-things (IoT) devices, printers, smart televisions, audio conferencing devices, medical smart devices, or any other computing devices. Within this description and the following claims, a "computing device" is defined as any device that includes at least a processor, system memory, and a network interface. Computing device 902 may further include a database 904, an encrypt 906, a decrypt 908, and a network interface 910. Computing device 912 may further include a network interface 920, a decrypt 916, an encrypt 918, and a database 914.

In an aspect, each of encrypt 906 and encrypt 918 is a data encryption system (e.g., encryption sequence storage and delivery system 100, or data encryption system 600) configured to decrypt data. Each of decrypt 908 and decrypt 916 is a data decryption system (e.g., encryption sequence storage and delivery system 100 or data decryption system 600) configured to decrypt data. In a particular aspect, encrypt 906 and decrypt 916 may be matched with a first encryption sequence; encrypt 918 and decrypt 908 may be matched with a second encryption sequence.

During data transmission from computing device 902 to computing device 912, the data is read from database 904, and input to encrypt 906 as data in 502. This data is encrypted by encrypt 906 using encryption sequence 104, and output by encrypt 906 as data out 506. Network interface 910 receives this encrypted data and transmits the encrypted data over public network 922. Network interface 920 receives this data and transmits the data to decrypt 916. Decrypt 916 receives the data as data in 502, decrypts the data using encryption sequence 104, and outputs decrypted data out 506 that is stored in database 914.

A similar sequence of operations occurs when computing device 912 has to transmit data to computing device 902. In this case, data from database 914 is encrypted by encrypt 918, transmitted over public network 922 via network interface 902, received by network interface 910, decrypted by decrypt 908, and stored in database 904.

Figure 10:
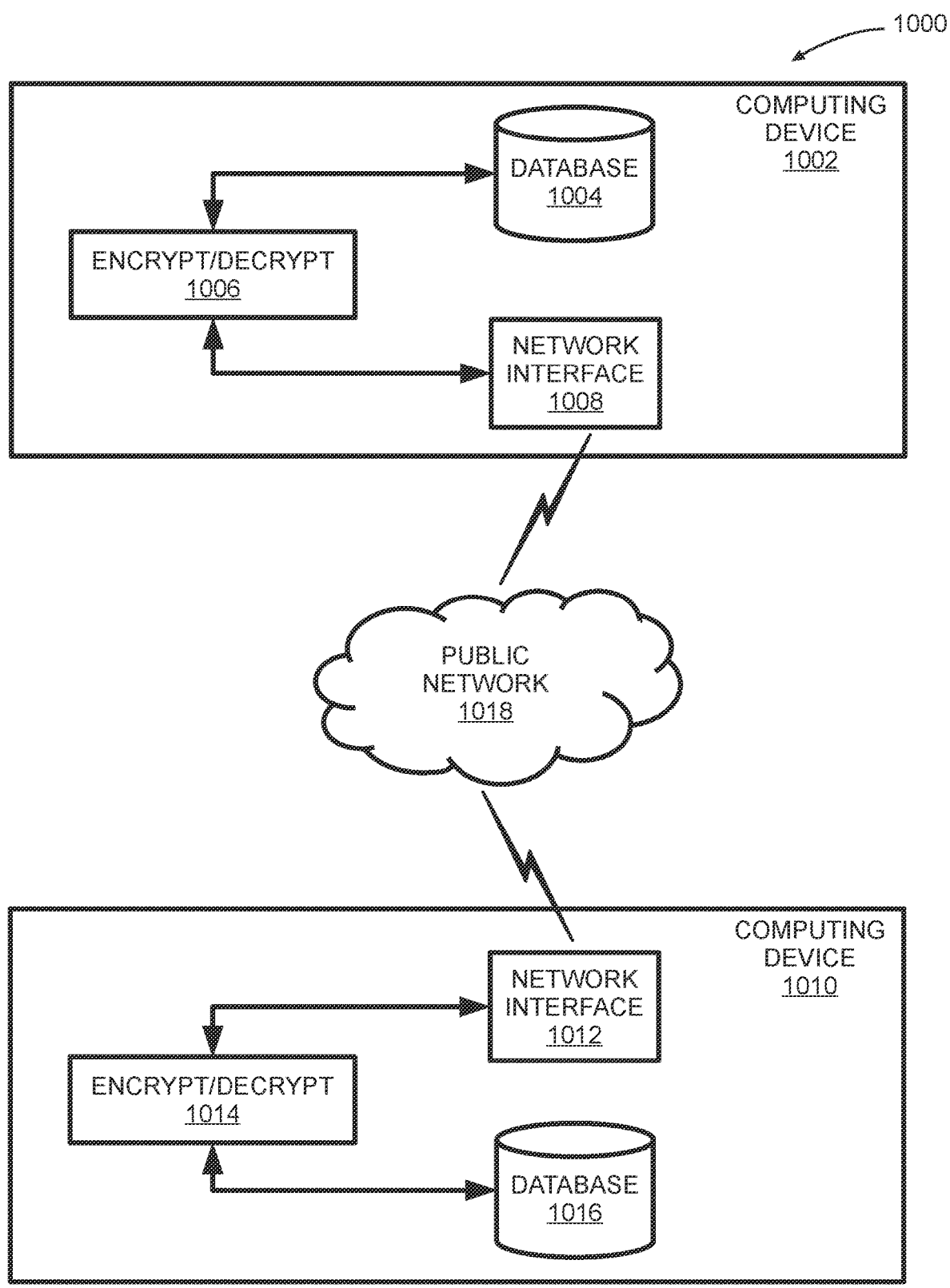
FIG. 10 is a block diagram depicting an example computer architecture of a secure computer network.

FIG. 10 is a block diagram depicting an example computer architecture of a secure computer network 1000. As depicted, computer network 1000 includes a computing device 1002 and a computing device 1010 configured to communicate with each other via a public network 1018. In an aspect, computing devices 1002 and 1010 can include any combination of desktop computers, laptop computers, servers, mobile devices such as tablets and cellular phones, internet-of-things (IoT) devices, printers, smart televisions, audio conferencing devices, medical smart devices, or any other computing devices. Computing device 1002 further includes a database 1004, an encrypt/decrypt 1006, and a network interface 1008. Computing device 1010 further includes a database 1016, an encrypt/decrypt 1014, and a network interface 1012. In an aspect, each of encrypt/decrypt 1006 and encrypt/decrypt 1014 are comprised of one or more data encryption systems that are collectively configured to perform encryption and decryption operations. For example, encrypt/decrypt 1006 may be configured as a combination of encrypt 906 and decrypt 908, and encrypt/decrypt 1014 may be configured as a combination of encrypt 918 and decrypt 916.

In an aspect, computing device 1002 transmits encrypted data to computing device 1010. To accomplish this, the associated data is retrieved from database 1004, encrypted by encrypt/decrypt 1006, and transmitted to network interface 1008. Network interface 1008 transmits the encrypted data to computing device 1010 via public network 1018, where the data is received by network interface 1012. Encrypt/decrypt 1014 decrypts this data and transmits the decrypted data to database 1016. A similar sequence of operations occurs if computing device 1010 wishes to send encrypted data to computing device 1002.

Figure 11:
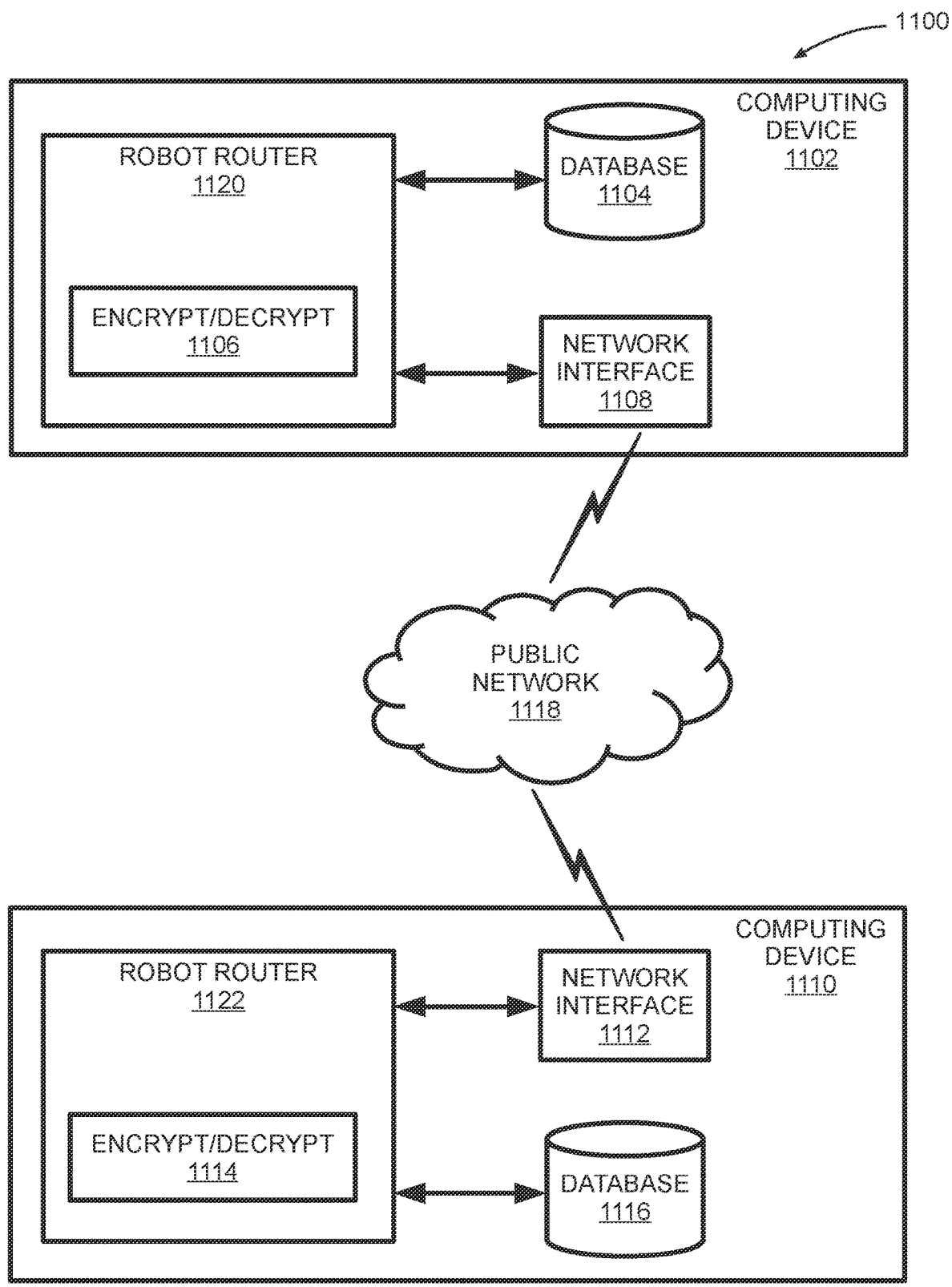
FIG. 11 is a block diagram depicting an example computer architecture of a secure computer network.

FIG. 11 is a block diagram depicting an example computer architecture of a secure computer network 1100. As depicted, computer network 1100 includes a computing device 1102 communicating with a computing device 1110 via a public network 1118. In an aspect, each of computing device 1102 and 1100 is any combination of desktop computers, laptop computers, servers, mobile devices such as tablets and cellular phones, internet-of-things (IoT) devices, printers, smart televisions, audio conferencing devices, medical smart devices, or any other computing devices. Computing device 1102 further includes a database 1104, a robot router 1120, and a network interface 1108. Robot router 1120 further includes an encrypt/decrypt 1106. Computing device 1110 further includes a database 1116, a robot router 1122, and a network interface 1112. Robot router 1122 further includes an encrypt/decrypt 1114.

Each of robot router 1120 and 1122 is a routing system that uses a specialized communication protocol and unidirectional communication channels to enforce additional security to any communication between computing devices 1102 and 1110. Each of encrypt/decrypt 1106 and 1114 perform similar functions to encrypt/decrypt 1006 and 1014 respectively.

In an aspect, computing device 1202 transmits encrypted data to computing device 1110. To accomplish this, the associated data is retrieved from database 1104, encrypted robot router 1120 and further encrypted by encrypt/decrypt 1106, and transmitted to network interface 1108. Network interface 1108 transmits the encrypted data to computing device 1110 via public network 1118, where the data is received by network interface 1112. Robot router 1122 and encrypt/decrypt 1114 together decrypt this data and transmit the decrypted data to database 1116. A similar sequence of operations occurs if computing device 1110 wishes to send encrypted data to computing device 1102.

Figure 12:
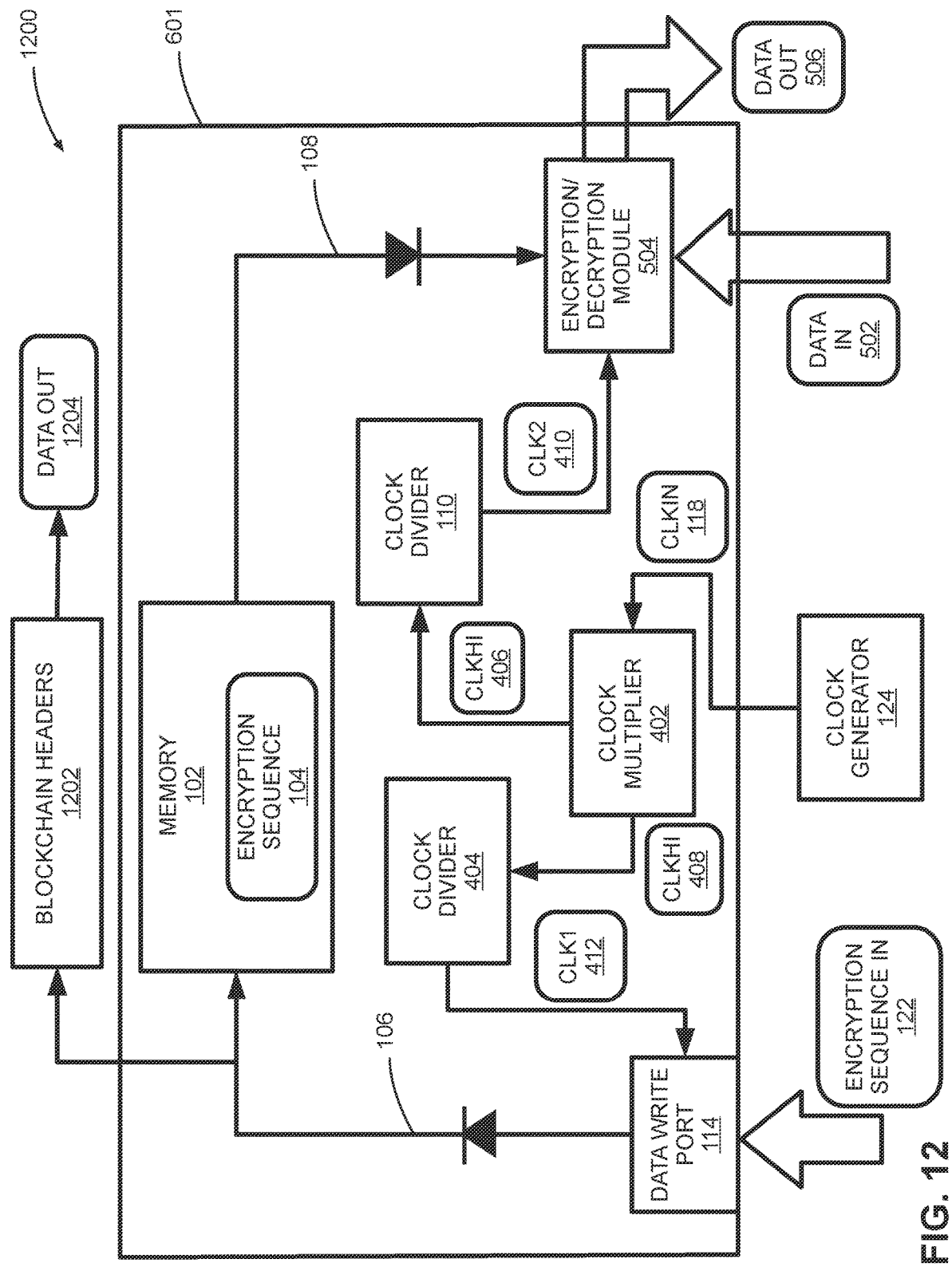
FIG. 12 is a block diagram depicting an example circuit architecture of a data encryption system.

FIG. 12 is a block diagram depicting an example circuit architecture of a data encryption system 1200. As depicted, data encryption system 1200 includes clock generator 124, a data encryption circuit 601, and blockchain headers 1202. Data encryption circuit 601 further includes data write port 114, memory 102 that stores encryption sequence 104, unidirectional data path 106, unidirectional data path 108, clock divider 110, clock multiplier 402, clock divider 404, and encryption/decryption module 504.

Data encryption circuit 601 is configured to store samples of encryption sequence data in 122 to memory 102 as encryption sequence 104. A portion of encryption sequence 104 is used by encryption/decryption module 504 to encrypt or decrypt data in 502 to generate data out 506.

In an aspect, blockchain headers 1202 is configured to provide a tamper detection capability to data encryption circuit 601. As depicted in FIG. 12, blockchain headers 1202 is external to data encryption circuit 601. Any efforts to tamper with data encryption circuit 601 can result in changes to blockchain headers 1202. These unauthorized changes can be detected during periodic reads of blockchain headers 1202, as data out 1204. In this way, unauthorized access to the data encryption circuit 601 can be detected. Hash values in blockchain headers 1202 can also be used to verify that data encryption circuit 601 can communicate with another similar circuit based on random number sets. Also, to limit hash operations, write operations may be limited to one block at a time; thus, hash execution only needs to occur when write a given block is done and when data encryption circuit 601 is powered up.

In an aspect, once data is written to data encryption circuit 601, it is extremely difficult for anyone to see the result of an associated encryption/decryption process by data encryption/decryption module 504 on data in 502, as data out 506. For example, it may not be possible to ever directly read the random number pool. In this way, the random number pool (i.e., encryption sequence 104) is always hidden from external view. Some features of data encryption circuit 601 that enable this behavior are:

A very large memory pool (i.e., memory 102) in which a random number set may be written.

Ability to write directly to the memory pool at high speed from an external source.

Extremely limited (or no) ability to read the pool externally (due to data encryption/decryption module 504).

Data encryption circuit 601 can support two distinct clock rates—a higher clock rate used for writing random or pseudorandom data into memory 104, and a (e.g., much) lower clock rate for reading random or pseudorandom data from memory 104 within data encryption circuit 601.

Additional circuitry that may be implemented in data encryption circuit 601 may limit writing operations to one full data block at a time in sequence (not random-access writing). This has the effect of creating a chip (i.e., a circuit) that can hold a random number sequence used for encryption that cannot be read quickly out of the circuit once the data is written to the circuit.

A blockchain configuration of hashing is implemented on data encryption circuit 601 using blockchain headers 1202. This helps ensure that any random data stored in the memory 102 has not changed in transit, or due to some unexpected operation on the chip. These hash values can be used to match two different data encryption circuits for encrypted communication.

Figure 13:
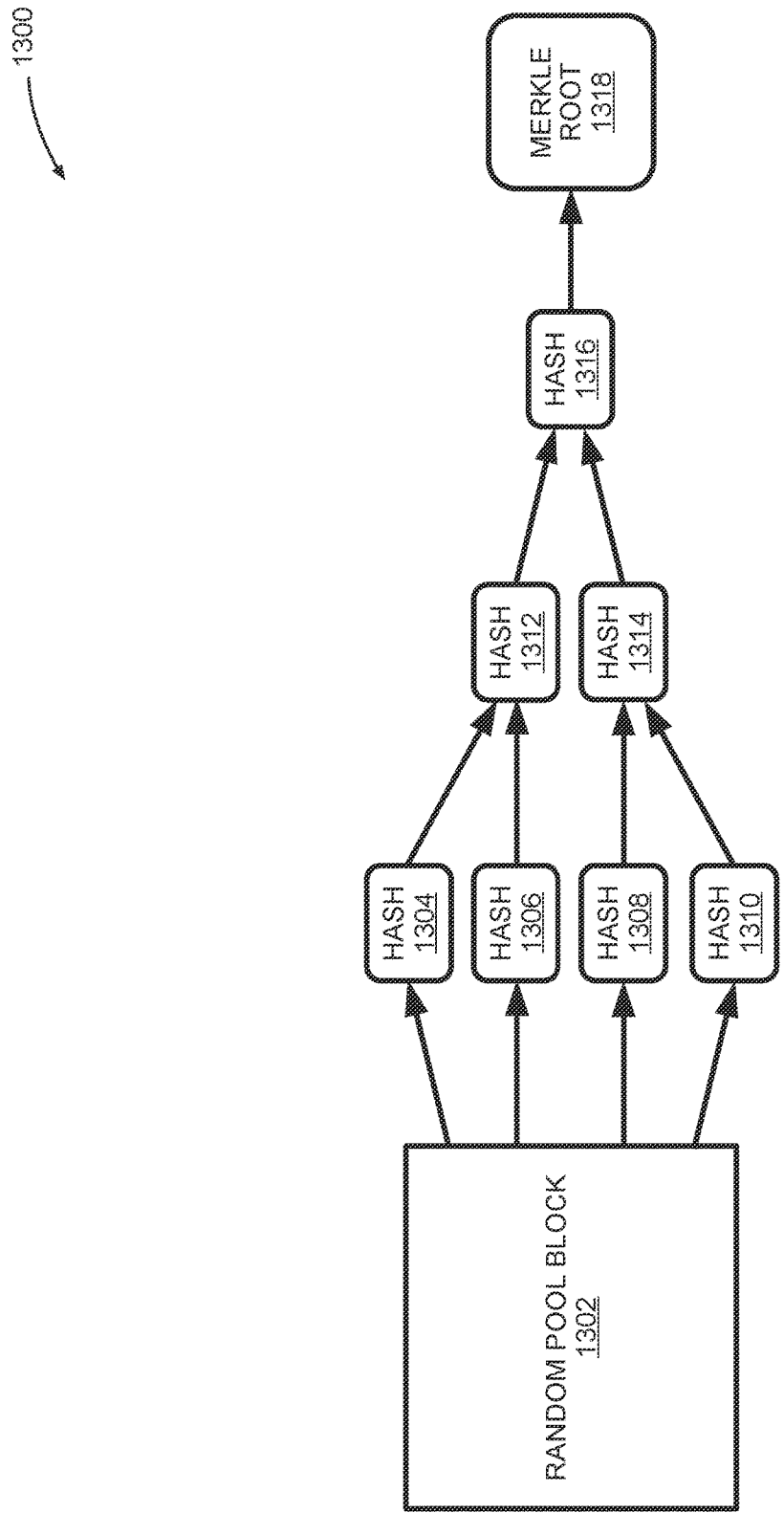
FIG. 13 is a schematic diagram depicting an example circuit to generate a Merkle root from a random pool block.

FIG. 13 is a schematic diagram depicting an example circuit 1300 to generate a Merkle root from a random pool block. In an aspect, a random pool block 1302 includes an arbitrarily long encryption sequence (e.g., encryption sequence 104). Portions of this encryption sequence may be used to generate a hash 1304, a hash 1306, a hash 1308, and a hash 1310. Each of hash 1304 through hash 1310 may be cryptographic hash used to encrypt data.

In one aspect, hash 1304 and hash 1306 may be further combined followed by a new hashing operation to generate a hash 1312. Hash 1308 and hash 1308 may combined in a similar manner to generate a hash 1314. Hash 1312 and hash 1314 may be further combined to generate a hash 1316. Hash 1316 may be further used as a basis of a Merkle root 1318. Merkle root 1318 may be used in a Merkle tree to implement a blockchain such as blockchain header 602 and blockchain headers 1202.

Figure 14:
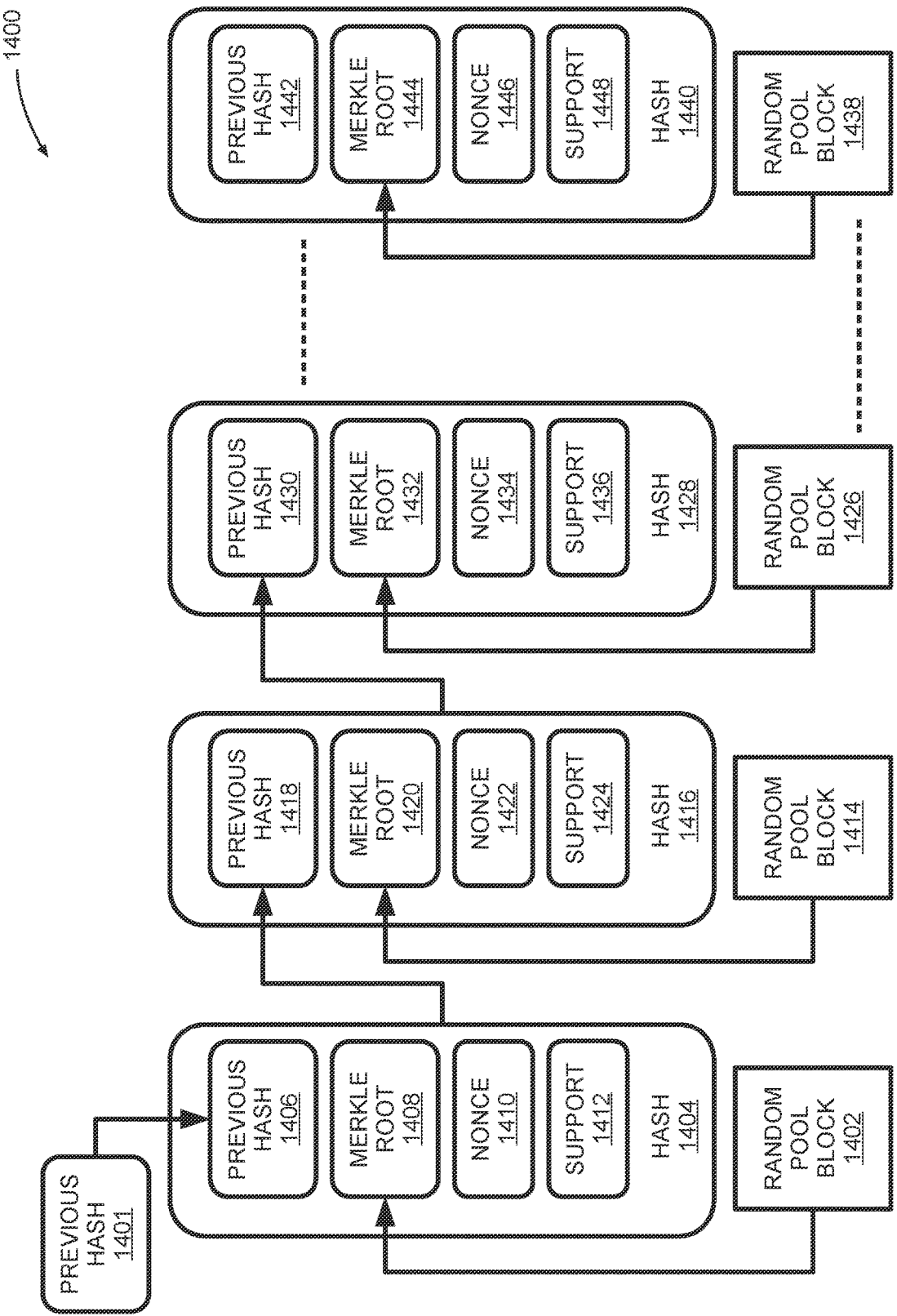
FIG. 14 is a block diagram depicting an example circuit to create a blockchain.

FIG. 14 is a block diagram depicting an example circuit 1400 to create a blockchain. In an aspect, circuit 1400 includes a random pool block 1402, a random pool block 1414, a random pool block 1426, and a random pool block 1438. In an aspect, each of random pool block 1402 through random pool block 1438 includes or generates an encryption sequence (such as encryption sequence 104) that is distinct from the encryption sequences included in the other random pool blocks. Each of random pool block 1402 through random pool block 1438 may be similar in structure and function to random pool block 1302.

In an aspect, each of random pool block 1402 through random pool block 1438 generates a hash. Specifically, random pool block 1402 generates a hash 1404; 1414 generates a hash 1416; 1426 generates a hash 1428; and 1438 generates a hash 1440. In general, a hash may include a previous hash, a Merkle root, a nonce, and a support. For example, a previous hash 1401 is used to generate a previous hash 1406 associated with hash 1404. Previous hash 1401 may be generated by a random pool block not shown in FIG. 14. Hash 1404 may also include a Merkle root 1408 generated by random pool block 1402 in a manner similar to the way Merkle root 1318 is generated by random pool block 1302.

In an aspect, hash 1404 may include a nonce 1410. Nonce 1410 may be a nonce used for further encryption strength, to increase the security of data encryption circuit 601. In an aspect, nonce 1410 and other nonces in circuit 1400 may be calculated when the encryption sequence associated with random pool block 1402 is created. A support 1412 included in hash 1404 may be a supporting encryption element used for additional encryption of data. An example of support 1412 may include additional keys or 2 party locks that may be created by adding more numbers affecting the hash. All of the additions to the hash operation (e.g., nonce, block data, previous block hash, etc.) must be identical for the hash to be the same.

In an aspect, previous hash 1406, Merkle root 1408, nonce 1410 and support 1412 may be used to generate hash 1404. These different elements used to generate hash 1404 may be combined, for example, by concatenating the elements into an associated hash circuit, or by using any of a number of other methods used in blockchain systems. Hash 1404 may be used to generate a previous hash 1418 included in hash 1416.

In one aspect, hash 1416 may include a Merkle root 1420 generated by random pool block 1414. Merkle root 1420 may be similar to Merkle root 1318. Hash 1416 may include a nonce 1422 that may be similar to nonce 1410. Hash 1416 may include a support 1424 that may function similarly to support 1412. In an aspect, previous hash 1418, Merkle root 1420, nonce 1422 and support 1424 may be used to generate hash 1416. Hash 1416 may be used to generate a previous hash 1430 included in hash 1428.

In one aspect, hash 1428 may include a Merkle root 1432 generated by random pool block 1426. Merkle root 1432 may be similar to Merkle root 1318. Hash 1428 may include a nonce 1434 that may be similar to nonce 1410. Hash 1428 may include a support 1436 that may function similarly to support 1412. In an aspect, previous hash 1430, Merkle root 1432, nonce 1434 and support 1436 may be used to generate hash 1428. Hash 1428 may be used as a previous hash for a next component in the chain. In some sense, hash 1428 is a composite hash of all prior hash functions and their associated components. In that sense, a hash propagates down the chain of random pool blocks.

In an aspect, the hash propagation associated with circuit 1400 continues till hash 1440. Hash 1440 may include a previous hash 1442 generated by a prior hash may include a Merkle root 1444 generated by random pool block 1438. Merkle root 1444 may be similar to Merkle root 1318. Hash 1440 may include a nonce 1446 that may be similar to nonce 1410. Hash 1440 may include a support 1448 that may function similarly to support 1412. In an aspect, previous hash 1442, Merkle root 1444, nonce 1446 and support 1448 may be used to generate hash 1440.

In essence, random pool block 1402 through random pool block 1438 and the associated hashes 1040 through 1440 respectively comprise a blockchain such as blockchain header 602 or blockchain headers 1202. In an aspect, hash 1440 may be used as an encrypted output sequence.

In an aspect, nonce 1410 through nonce 1446 may be calculated when random data is created is created for the respective random pool block, and added to the blockchain calculation when the corresponding data encryption circuit (e.g., data encryption circuit 601) is loaded. This allows a user to create paired integrated circuits (chips) where the corresponding hashes are totally different than another chip with the same random number pool (i.e., encryption sequence).

In one aspect, a blockchain is calculated when associated data is input into the memory. This calculation may be performed as the data is loaded into the memory. This has the advantage that if the memory is purposely made to be read slow, the blockchain can still be created when the data is written into the memory. In another aspect, writes may be limited one block of the blockchain at a time, with an ability to write a smaller amount of data being blocked, or prohibited.

Figure 15:
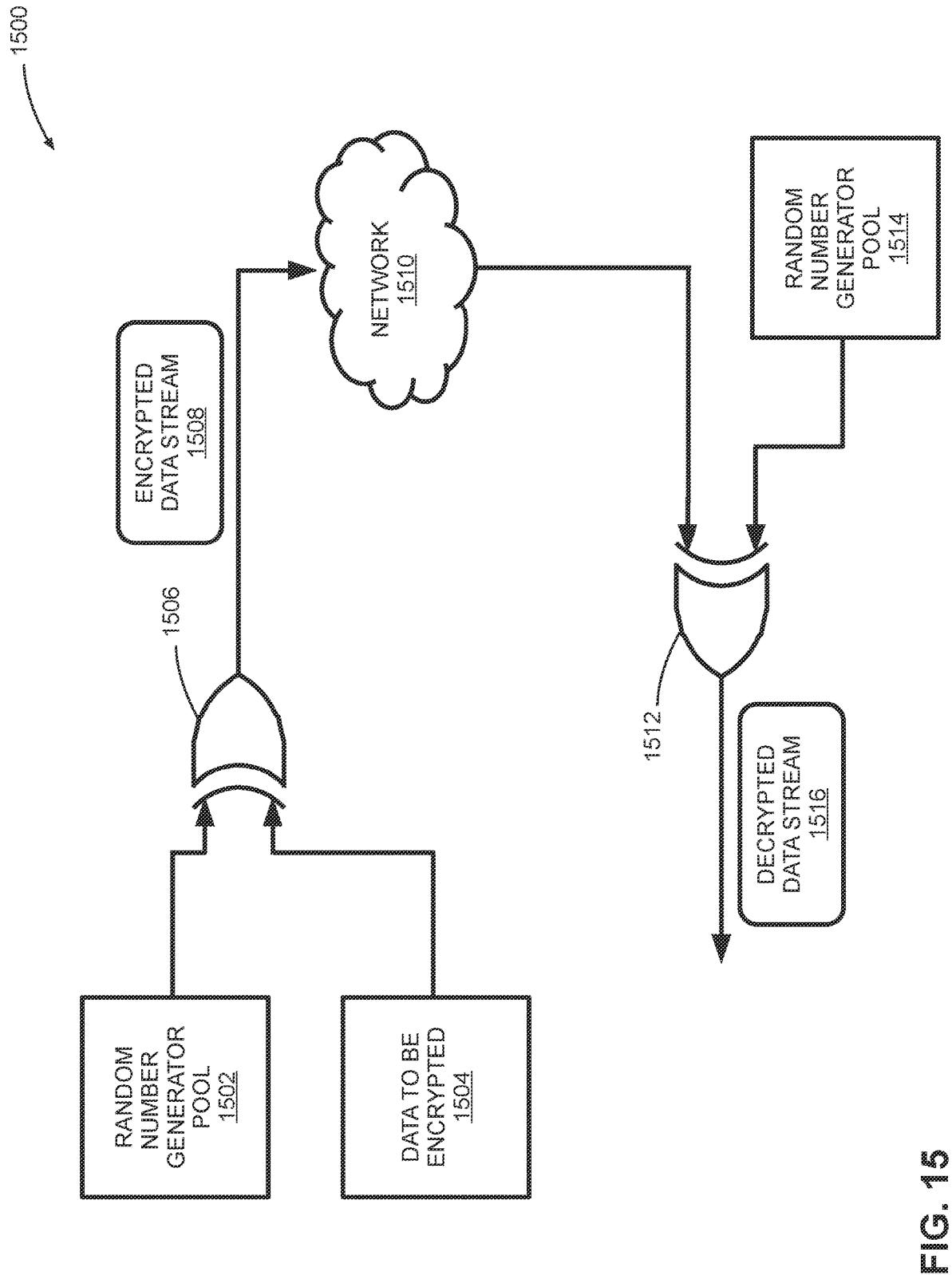
FIG. 15 is a block diagram depicting an example circuit to perform a data encryption and decryption process.

FIG. 15 is a block diagram depicting an example circuit 1500 to perform a data encryption and decryption process. In an aspect, circuit 1500 includes a random number generator pool 1502, data to be encrypted 1504, an XOR gate 1506, a network 1510, an XOR gate 1512, and a random number generator pool 1514.

In an aspect, each of random number generator pool 1502 and 1514 stores an encryption sequence such as encryption sequence 104. Each of random number pool 1502 and 1514 may store one or matched sets of random sequences, and may also include correspondingly matched blockchain and/or Merkle tree encryptions.

Data to be encrypted 1504 may be data to be communicated from a sender to a recipient over network 1510. In one aspect, network 1510 may be a private network such as a LAN. In another aspect, network 1510 may be a public network such as the Internet. An output of random number generator pool may be a hashed output of a blockchain that includes one or more sets of encryption sequences. The output of random number generator pool 1502 is used as an input to XOR gate 1506 to encrypt a data output of data to be encrypted 1504 at the second input of XOR gate 1506.

In an aspect, XOR gate 1506 generates an encrypted data stream 1508 that is transmitted over network 1510 to a destination (recipient). Encrypted data stream 1508, when received at the destination, is input to XOR gate 1512. An output of random number generator pool 1514 is input to a second input of XOR gate 1512 and used to decrypt encrypted data stream 1508. XOR gate 1512 outputs a decrypted data stream 1516 that includes the intended communication message from the sender.

Aspects of the inventions described herein provide an improvement over the current art in several areas. Some aspects include designing an integrated circuit or a subsystem that can be loaded with a very large set, or pool, of random numbers (e.g., tens of gigabytes to several terabytes). This pool may be arranged in 'blocks' where a number of blocks make up the pool. One use of these random numbers is for encryption of communications. For example, if the pools are implemented on integrated circuits (or "chips"), two matched chips could be loaded with the same random number set. Of this matched pair of chips, one chip could be installed on a submarine, while the other chip could be installed on a terrestrial base station. Any communication that is encrypted by one of the chips could be read by the paired chip but not by any other mechanism.

In an aspect, the blocks comprising the pool are designed to be be easy to load on the chip, and are loadable in a reasonable amount of time such as seconds, minutes or perhaps an hour or so at a maximum. Once loaded, it is desirable for these random numbers to be very difficult to read or to infer by any attack, both during transit where physical access by attackers may occur, and once the circuit is deployed for communication encryption where both cyberattacks or physical access may occur. It is also desirable for blocks to be readily identifiable by the intended user, but difficult to discern by attackers. It is desirable for any changes or tampering with the random numbers to be detected. It is also desirable in some cases to zero out a block once it is used so there is no way older communications can ever be decoded by attackers even if they steal the chip. These features are implemented on the systems and methods described herein.

Other features associated with the systems and methods described herein include:

* Fast write but slow read of the memory helps to limit readability of the blocks but allows reasonable write times for loading the memory.

* Limiting external access to memory address bits below the block address and forcing the write of the memory to proceed, for example, from address 0x0 to address 0xFFF . . . for each block, thus forcing the entire block to be written with each write. This limits the ability of attackers to have random access into any blocks.

* Adding the ability to hash the blocks and form a blockchain on a chip creates a mechanism of detection of any tampering that changes values of the random numbers, since any sort of tampering would change the hash values. It also provides a mechanism for paired chips or subsystems to recognize each other by viewing hash values of each other.

* Adding a nonce to the hash operation of the blockchain creates further security of the random number set by allowing the user who writes the blocks to add a code to the hash operation that causes the hash value to conform to some desired limitation, and makes identification of the block specific to the users of the paired chips.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. An apparatus comprising:
a clock generator configured to generate a clock signal at a first frequency; and
a circuit utilizing the clock signal to coordinate operations, comprising:
    a port configured to receive an encryption sequence from another system at the first frequency;
    a first unidirectional data path between the port and a memory configured to:
        permit data transfer from the port to the memory; and
        prevent data transfer from the memory to the port;
    the memory configured to:
        access the encryption sequence from the port via the first unidirectional data path and store the data transfer from the port to the memory; and
    a clock divider configured to divide the first frequency by a divisor deriving another clock signal at a second frequency, the second frequency lower than the first frequency;
    an encryption/decryption module configured to read a portion of the encryption sequence from the memory via a second unidirectional data path at the second frequency,
    process input using the portion of the encryption sequence, and generate output responsive to the processing.

2. The apparatus of claim 1, wherein the processing is an encryption operation, and the output data is encrypted data.

3. The apparatus of claim 1, where in the processing is a decryption operation, and the output data is decrypted data.

4. The apparatus of claim 1, further comprising a blockchain configured to implement tamper resistance.

5. The apparatus of claim 1, wherein the port is input-only.

6. The apparatus of claim 1, wherein the second unidirectional port is configured to:
permit data transfer from the memory to the encryption/decryption module; and prevent data transfer from the encryption/decryption module to the memory.

7. An apparatus comprising:
a clock generator configured to generate a clock signal at a reference frequency; and
a circuit utilizing the clock signal to coordinate operations comprising:
    a clock multiplier configured to multiply the reference frequency generating a higher clock at a higher frequency, the higher frequency higher than the reference frequency;
    a first clock divider configured to divide the higher frequency generating a first lower clock signal at a first lower frequency, the first lower frequency lower than the higher frequency;
    a second clock divider configured to divide the higher frequency generating a second lower clock signal at a second lower frequency, the second lower frequency lower than the higher frequency;
    a port configured to receive an encryption sequence from another system at the first lower frequency;
    a first unidirectional data path between the port and a memory configured to:
        permit data transfer from the port to the memory; and
        prevent data transfer from the memory to the port;
    the memory configured to receive the encryption sequence from the port via the first unidirectional data path and store the data transfer from the port to the memory; and
    an encryption/decryption module configured to read a portion of the encryption sequence from the memory via a second unidirectional data path at the second lower frequency,
    process input using the portion of the encryption sequence, and
    generate output responsive to the processing.

8. The apparatus of claim 7, wherein the processing is an encryption operation, and the output data is encrypted data.

9. The apparatus of claim 7, where in the processing is a decryption operation, and the output data is encrypted data.

10. The apparatus of claim 7, further comprising a blockchain configured to implement tamper resistance.

11. The apparatus of claim 7, wherein the higher frequency is approximately equal to a maximum clock frequency supported by the circuit.

12. The apparatus of claim 7, wherein the second unidirectional port is configured to: permit data transfer from the memory to the encryption/decryption module; and prevent data transfer from the encryption/decryption module to the memory.

13. A method comprising:
receiving a clock signal at a first frequency;
utilizing the clock signal to coordinate operations associated with a circuit, the operations comprising:
    receiving an encryption sequence at a port from another system at the first frequency;
    permitting data transfer from the port to a memory;
    preventing data transfer from the memory to the port;
    accessing the encryption sequence from the ort via a first unidirectional data path; and
    storing the data transfer from the port to the memory;
dividing the first frequency by a divisor;
deriving another clock signal at a second frequency, the second frequency lower than the first frequency;
reading a portion of the encryption sequence from the memory via a second unidirectional data path at the second frequency;
processing input using the portion of the encryption sequence; and
generating an output responsive to the processing.

14. The method of claim 13, wherein the processing is an encryption operation, and the output is encrypted data.

15. The method of claim 13, where in the processing is a decryption operation, and the output is decrypted data.

16. The method of claim 13, further comprising detecting any attempts to tamper with the encryption sequence.

17. A method comprising:
generating a reference clock signal at a reference frequency;
multiplying the reference frequency of the reference clock signal to generate a higher frequency clock signal at a higher frequency, the higher frequency higher than the reference frequency;
performing a first frequency division on the reference clock signal to generate a first lower clock signal at a first lower frequency, the first lower frequency lower than the higher frequency;
performing a second frequency division on the reference clock signal to generate a second lower clock signal at a second lower frequency, the second lower frequency lower than the higher frequency;
receiving an encryption sequence from another system at a port at the first lower frequency;
transmitting the encryption sequence to a memory location via a first unidirectional data path;

retrieving a portion of the encryption sequence from the memory location via a second unidirectional data path at the second lower frequency;

processing input data using the portion of the encryption sequence; and generating output responsive to the processing.

18. The method of claim 17, wherein the processing is an encryption operation, and the output is encrypted data.

19. The method of claim 17, where in the processing is a decryption operation, and the output is decrypted data.

20. The method of claim 17, further comprising detecting any attempts to tamper with the encryption sequence.

* * * * *

UNITED STATES PATENT AND TRADEMARK OFFICE
CERTIFICATE OF CORRECTION

PATENT NO. : 11,494,521 B2
APPLICATION NO. : 17/235840
DATED : November 8, 2022
INVENTOR(S) : Alistair Black It is certified that error appears in the above-identified patent and that said Letters Patent is hereby corrected as shown below:

In the Claims

In Column 22, Line 31, Claim 13 "ort" should be "port"

Signed and Sealed this
Eleventh Day of July, 2023

Katherine Kelly Vidal
*Director of the United States Patent and Trademark Office*